(12) United States Patent (10) Patent No.: US 9,363,730 B2
Kang et al. (45) Date of Patent: Jun. 7, 2016

(54) METHOD AND APPARATUS FOR SEAMLESS HANDOVER OPERATION IN A WIRELESS COMMUNICATION SYSTEM

(71) Applicants: Samsung Electronics Co., Ltd., Suwon-si, Gyeonggi-do (KR); Korea Advanced Institute of Science and Technology, Daejeon (KR)

(72) Inventors: Hyun-Jeong Kang, Seoul (KR); Tae-Soo Kwon, Vancouver (CA); Ju Yong Lee, Daejeon (KR); Han Young Yim, Daejeon (KR); Tae-Young Kim, Seongnam-si (KR)

(73) Assignees: Samsung Electronics Co., Ltd., Suwon-si (KR); Korea Advanced Institute of Science and Technology, Daejeon (KR)

( * ) Notice: Subject to any disclaimer, the term of this patent is extended or adjusted under 35 U.S.C. 154(b) by 109 days.

(21) Appl. No.: 14/053,979

(22) Filed: Oct. 15, 2013

(65) Prior Publication Data

US 2014/0105050 A1 Apr. 17, 2014

(30) Foreign Application Priority Data

Oct. 15, 2012 (KR) .................. 10-2012-0114180

(51) Int. Cl.
*H04W 28/16* (2009.01)
*H04W 36/30* (2009.01)
*H04W 24/08* (2009.01)
*H04W 36/00* (2009.01)

(52) U.S. Cl.
CPC .............. *H04W 36/30* (2013.01); *H04W 24/08* (2013.01); *H04W 36/0055* (2013.01)

(58) Field of Classification Search
CPC .. H04W 36/30; H04W 24/08; H04W 36/0055
See application file for complete search history.

(56) References Cited

U.S. PATENT DOCUMENTS

| 2010/0035600 | A1 | 2/2010 | Hou et al. | |
|---|---|---|---|---|
| 2013/0115951 | A1* | 5/2013 | Deng | H04W 36/24 455/436 |
| 2013/0294390 | A1* | 11/2013 | Yang et al. | 370/329 |
| 2014/0092799 | A1* | 4/2014 | Jain et al. | 370/311 |

FOREIGN PATENT DOCUMENTS

| EP | 0 981 919 B1 | 1/2007 |
|---|---|---|
| EP | 2 244 503 A1 | 10/2010 |
| WO | 2005/039215 A1 | 4/2005 |

OTHER PUBLICATIONS

Project Planning Committee, Hierarchical Network Study Report (clean version), IEEE 802.16-12-0136-00-G, IEEE 802.16 Broadband Wireless Access Working Group, Jan. 18, 2012.
Samsung, Additional Details on Dynamic Switching of DMRS Scrambling for Downlink CoMP', R1-123474, 3GPP TSG RAN WG1 #70, Qingdao, China, Aug. 13-17, 2012.

* cited by examiner

*Primary Examiner* — Jay P Patel
(74) *Attorney, Agent, or Firm* — Jefferson IP Law, LLP

(57) ABSTRACT

A method and apparatus for improving a mobile problem caused by a narrow handover region in a boundary region between virtual cells constructed by a plurality of small base stations are provided. A plurality of Virtual Cells (VCs) include a plurality of Distributed Base Stations (DBSs) whose VCs cooperatively communicate with each other. An Intermediate Distributed Base Station (I-DBS) is located in a region where adjacent at least two VCs among the plurality of VCs are superimposed, and belongs to a different VC according to a time division scheme.

24 Claims, 21 Drawing Sheets

METHOD AND APPARATUS FOR SEAMLESS HANDOVER OPERATION IN A WIRELESS COMMUNICATION SYSTEM

CROSS-REFERENCE TO RELATED APPLICATION(S)

This application claims the benefit under 35 U.S.C. §119(a) of a Korean patent application filed on Oct. 15, 2012 in the Korean Intellectual Property Office and assigned Serial No. 10-2012-0114180, the entire disclosure of which is hereby incorporated by reference.

JOINT RESEARCH AGREEMENT

The present disclosure was made by or on behalf of the below listed parties to a joint research agreement. The joint research agreement was in effect on or before the date the present disclosure was made and the present disclosure was made as a result of activities undertaken within the scope of the joint research agreement. The parties to the joint research agreement are 1) Samsung Electronics Co., Ltd and 2) Korea Advanced Institute of Science and Technology.

TECHNICAL FIELD

The present disclosure relates to a next-generation mobile communication technology for improving a radio capacity and concurrently enabling seamless and stable mobility support in a wireless communication system.

BACKGROUND

An object of a communication system is to transmit a large amount of data at a low error rate. To achieve this, the communication system should have a high system capacity. In recent years, a femtocell technology for decreasing a cell radius to decrease an interval between a user and a Radio Access Unit (RAU) and thus improve performance, a Coordinated MultiPoint (CoMP) technology for improving the performance of a cell boundary user equipment through coordinated transmission of adjacent base stations, a Virtual Cell Network (VCN) technology and the like have been proposed.

A VCN represents a network topology of adaptively forming virtual cells and providing a service so as to maximize a frequency resource use efficiency in a multiple-cell environment in which user/traffic/interference characteristics are different from one another. Distributed base stations or distributed small base stations, which belong to the virtual cells, share information in real time. Based on the shared information, the DBSs can control interference using a transmission technique such as coordinated beamforming and the like. This VCN environment improves performance through a spatial reuse of wireless resources. However, frequent handover takes place between the virtual cells. Because a boundary region between the virtual cells is a boundary between small base stations having small coverage, a handover region is narrow and there is a possibility in which handover is carried out at a low reception signal level. Accordingly, there is a need to efficiently improve a mobility problem between virtual cells formed by a plurality of distributed small base stations such as the VCN.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages below. Accordingly, an aspect of the present disclosure is to provide a method and apparatus for improving a mobility problem resulting from a narrow handover region in a boundary region between virtual cells constructed by a plurality of small base stations.

Another aspect of the present disclosure is to provide a method and apparatus for widening a handover region in a boundary region between virtual cells constructed by a plurality of small base stations.

Another aspect of the present disclosure is to provide a method and apparatus leading to handover at a good reception signal level in a boundary region between virtual cells constructed by a plurality of small base stations.

The above aspects are achieved by providing a method and apparatus for seamless handover operation in a wireless communication system.

In accordance with an aspect of the present disclosure, a wireless communication system is provided. The system includes a plurality of Virtual Cells (VCs), and an Intermediate Distributed Base Station (I-DBS). The plurality of VCs include a plurality of Distributed Base Stations (DBSs) whose VCs cooperatively communicate with each other. The I-DBS is located in a region where adjacent at least two VCs among the plurality of VCs are superimposed, and belongs to a different VC according to a time division scheme.

In accordance with another aspect of the present disclosure, an operation method of an I-DBS located in a region where adjacent at least two VCs among a plurality of VCs are superimposed, in a wireless communication network including the plurality of VCs constructed by a plurality of DBSs whose VCs cooperatively communicate with each other, and an UE is provided. The method includes during a first time period, belonging to a first VC of the at least two VCs and servicing the UE, and, during a second time period different from the first time period, belonging to the second VC of the at least two VCs different from the first VC and servicing the UE.

In accordance with another aspect of the present disclosure, an operation method of an UE in a wireless communication network having a plurality of VCs constructed by a plurality of DBSs whose VCs cooperatively communicate with each other, an I-DBS located in a region where adjacent at least two VCs among the plurality of VCs are superimposed, and the UE is provided. The method includes during a first time period, transmitting/receiving data through a first VC of the at least two VCs, and, during a second time period different from the first time period, receiving control information through the second VC of the at least two VCs different from the first VC.

In accordance with another aspect of the present disclosure, an apparatus of an I-DBS located in a region where adjacent at least two VCs among a plurality of VCs are superimposed, in a wireless communication system including the plurality of VCs constructed by a plurality of DBSs whose VCs cooperatively communicate with each other, and an UE is provided. The apparatus includes a controller, and a transmitter/receiver. The controller is configured to allocate the at least two VCs to the UE according to a time division scheme. According to the allocation result of the controller, during a first time period, the transmitter/receiver performs a signal transmission/reception operation such that the UE is serviced through the first VC of the at least two VCs and, during a second time period different from the first time period, performs a signal transmission/reception operation such that the UE is serviced through a second VC of the at least two VCs different from the first VC.

In accordance with another aspect of the present disclosure, an apparatus of an UE in a wireless communication system including a plurality of VCs constructed by a plurality of DBSs whose VCs cooperatively communicate with each other, an Intermediate I-DBS located in a region where adjacent at least two VCs among the plurality of VCs are superimposed, and the UE is provided. The apparatus includes a transmission/reception unit. During a first time period, the transmission/reception unit transmits/receives data through the first VC of the at least two VCs and, during a second time period different from the first time period, receives control information through a second VC of the at least two VCs different from the first VC.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purposes only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
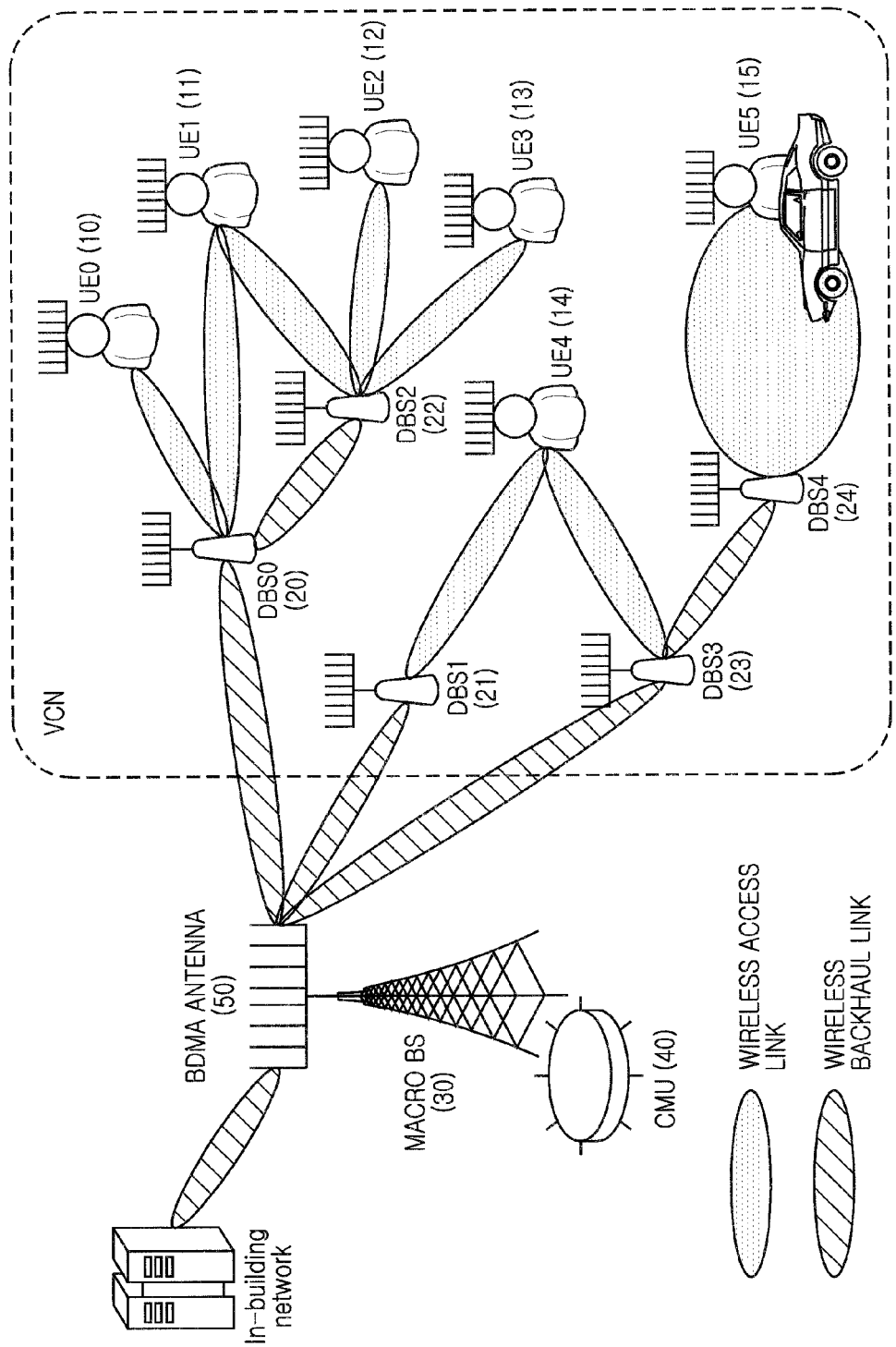
FIG. 1 is a diagram illustrating an example of a wireless communication system according to an embodiment of the present disclosure.

FIG. 1 is a diagram illustrating an example of a wireless communication system according to an embodiment of the present disclosure.

Referring to FIG. 1, the wireless communication system includes a plurality of User Equipment (UEs) or Mobile Terminal (MTs) 10-15, Distributed Base Stations or Distributed small Base Stations (DBSs) 20-24, a macro BS 30 being an upper layer of the DBSs 20-24, and a Central Management Unit (CMU) 40. The CMU 40 is a central control device controlling the cooperative transmission/reception of the DBSs 20-24, and can be included within the macro BS 30. The DBSs 20-24 perform Multi-Input Multi-Output (MIMO) cooperative transmission/reception, and form a cooperative cluster. The DBSs 20-24 include the entire or some functions of general base stations.

The macro BS 30 supports a wireless backhaul function of the DBSs 20-24, and includes a Beam Division Multiple Access (BDMA) antenna 50. The DBSs 20-24 and the UEs 10-15 include antennas corresponding to the BDMA antenna 50 for cooperative transmission/reception. The macro BS 30 and the DBSs 20-24 access each other through a wireless backhaul link. For example, the macro BS 30 and the DBSs 20, 21, and 23 are accessed through the wireless backhaul link. Similarly, the DBS 20 and the DBS 22 access each other through the wireless backhaul link, and the DBS 23 and the DBS 24 also access each other through the wireless backhaul link. The UEs 10-15 access the various DBSs 20-24 through a wireless access link. For example, the UEs 10 and 11 access the DBS 20 through the wireless access link, the UEs 11, 12, and 13 access the DBS 22 through the wireless access link, the UE 14 accesses the DBS 21 through the wireless access link, the UE 14 accesses the DBS 23 through the wireless access link, and the UE 15 accesses the BS 24 through the wireless access link.

Figure 17:
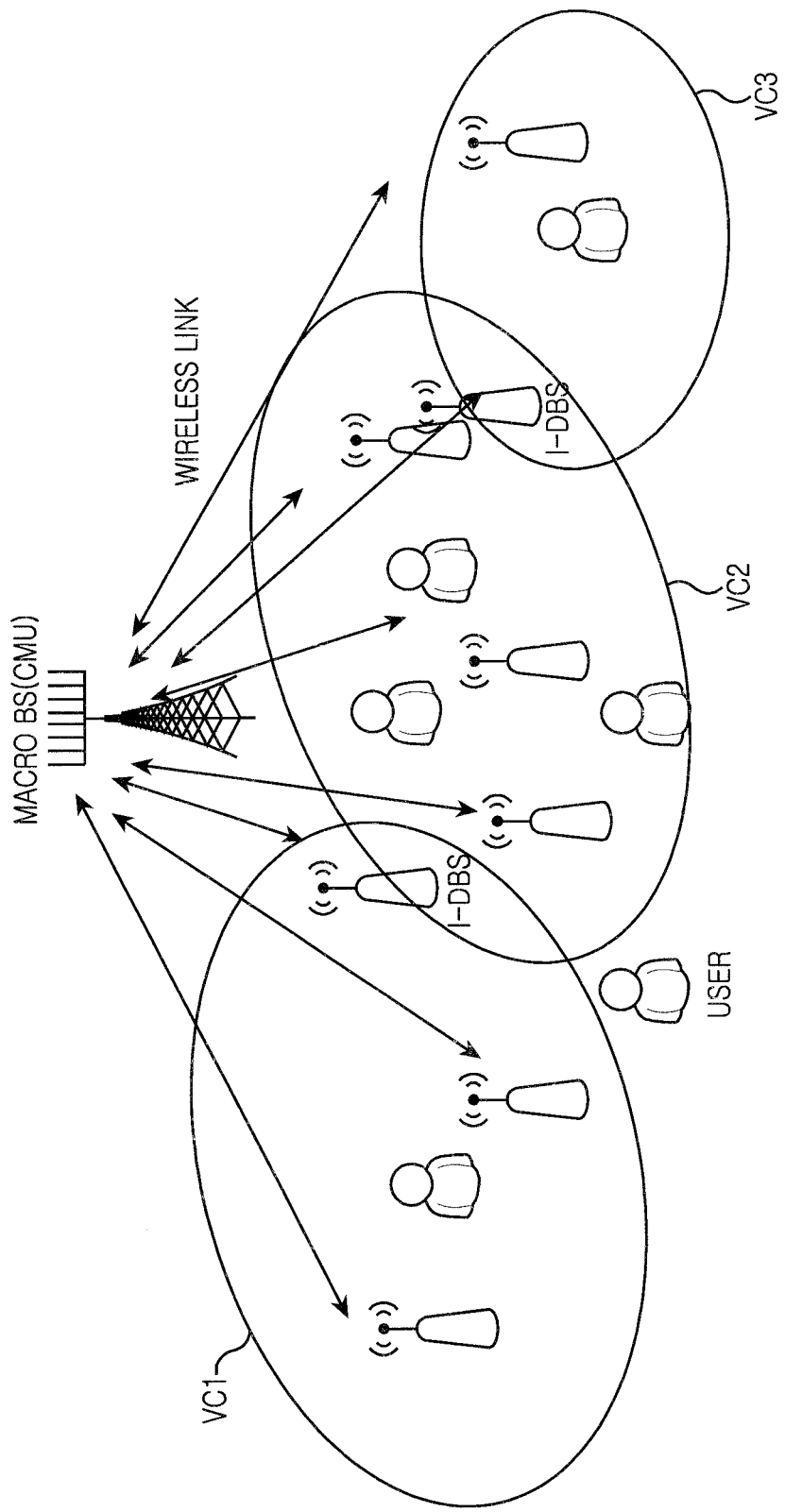
FIGS. 17, 18, and 19 are diagrams illustrating environments according to various embodiments of the present disclosure.

Various embodiments of the present disclosure described below are applicable to an outdoor Virtual Cell Network (VCN) environment in which a plurality of cooperative DBSs are distributed as illustrated in FIGS. 1 and 17. In addition, the various embodiments of the present disclosure are applicable even to an outdoor distributed antenna environment and an in-building wireless network environment as each illustrated in FIGS. 18 and 19.

Basic Concept and Principle of the Disclosure

The present disclosure relates to a next-generation mobile communication technology for improving a radio capacity and concurrently enabling seamless and stable mobility support in a wireless communication system. The present disclosure, by using a technology of forming virtual cells through cooperation of a plurality of small BSs, addresses an interference problem and concurrently proposes a way of control signal/data resource allocation for efficient mobility support in an environment in which the plurality of small BSs are installed for the sake of performance improvement through a spatial reuse of a wireless resource. The basic concept and principle of the present disclosure will be described before a detailed description of various embodiments of the present disclosure.

A next-generation communication technology is considering a VCN environment of concurrently achieving a cell splitting gain through a spatial reuse of a wireless resource and a gain resulting from a cooperative communication between adjacent cells. In this VCN environment, frequent inter-cell handover takes place as a plurality of small cells are installed. As a way to address this issue, a scenario in which Virtual Cells (VCs) constructed by one or more DBSs performing cooperative communications transmit the same broadcast control signal with the same cell IDentifier (ID) is being considered.

Figure 2A:
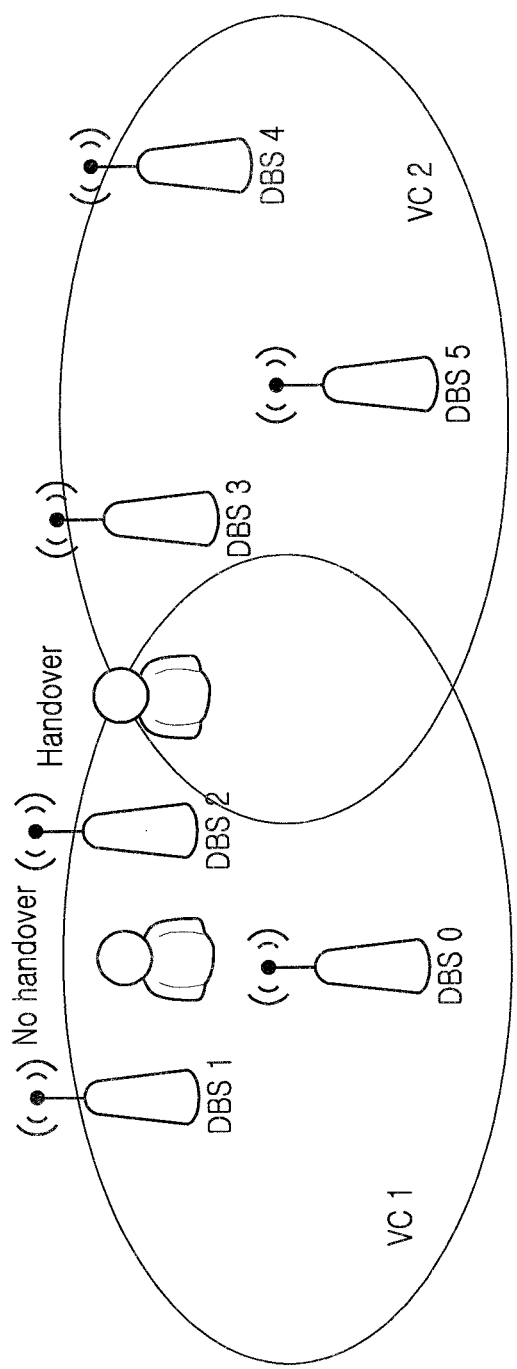
FIGS. 2A and 2B are diagrams describing virtual cell forming and mobility control operation according to a method of cell IDentifier (ID) allocation per Distributed Base Station (DBS) according to an embodiment of the present disclosure.
Figure 2B:
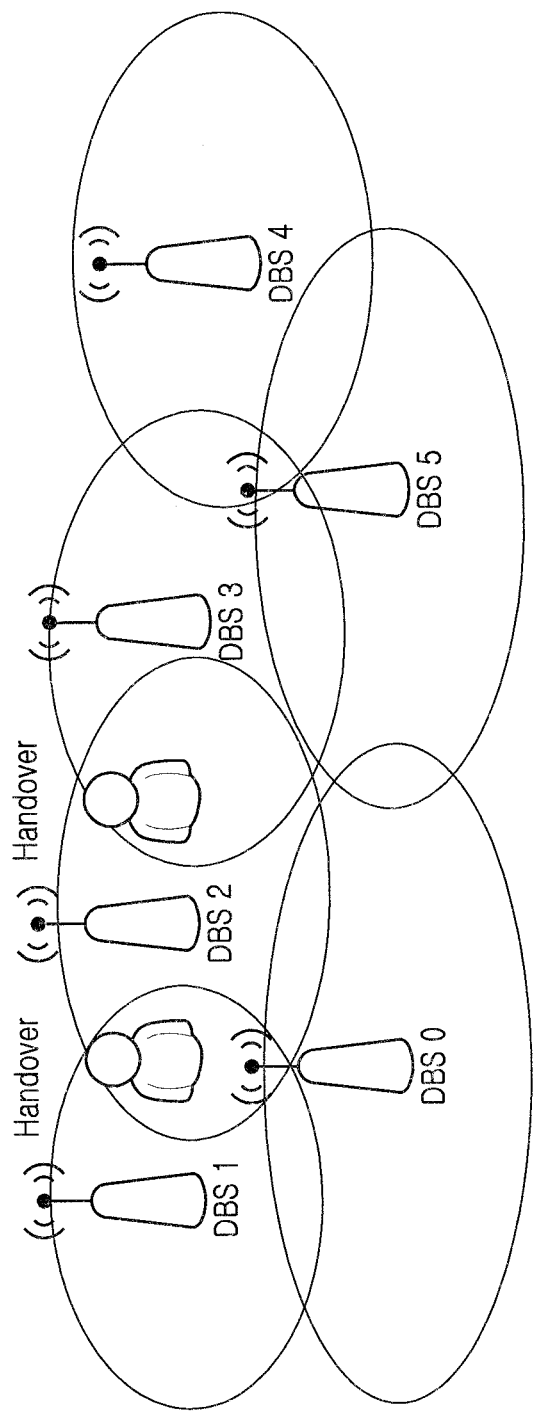

FIGS. 2A and 2B are diagrams describing virtual cell forming and mobility control operation according to a method of cell IDentifier (ID) allocation per Distributed Base Station (DBS) according to an embodiment of the present disclosure.

Referring to FIGS. 2A and 2B, when a plurality of DBSs form VCs by cooperating with each other, the DBSs within the VCs may use the same cell ID as illustrated in FIG. 2A or may not use the same cell ID as illustrated in FIG. 2B. In a spatial reuse aspect of a broadcast control channel and a Cell specific Reference Signal (CRS), it is advantageous that the VC has a different cell ID per DBS as illustrated in FIG. 2B. If the DBS use different cell IDs, the reuse of the broadcast control channel and the CRS is available and channel estimation per DBS is easy. However, upon movement between the DBSs, frequent handover occurs even when the DBSs perform cooperative communication. If the VC has a different cell ID per DBS, frequent handover between the small DBSs is induced. Accordingly, in a handover aspect, it is advantageous that the DBSs forming the VCs use the same cell ID as illustrated in FIG. 2A.

If the DBSs forming the VCs use the same cell ID, user mobility support is available without handover within the VCs, but the reuse efficiency for the broadcast control channel and the CRS is decreased. In addition, to apply a network MIMO technology between the DBSs within the VCs, there is a need to define a pilot signal per DBS. For example, in a 3rd Generation Partnership Project (3GPP) Long Term Evolution (LTE) system, a plurality of Remote Radio Heads (RRHs) are installed and the RRHs are controlled at a center. In the LTE system, when the plurality of RRHs form a Distributed Antenna System (DAS), groups of specific RRHs use the same cell ID so as to decrease frequent handover. This LTE R-10 system provides the definition of a Channel State Indicator-Reference Signal (CSI-RS) for estimating a channel between the RRHs even at the time of using the same cell ID. To implement a spatial multiplexing distributed antenna system, a pilot signal distinguishable per RRH/per RRH antenna is needed. As a result, the CSI-RS has been defined. However, a handover problem between VCs constructed by the RRHs using the same cell ID still remains.

Figure 3A:
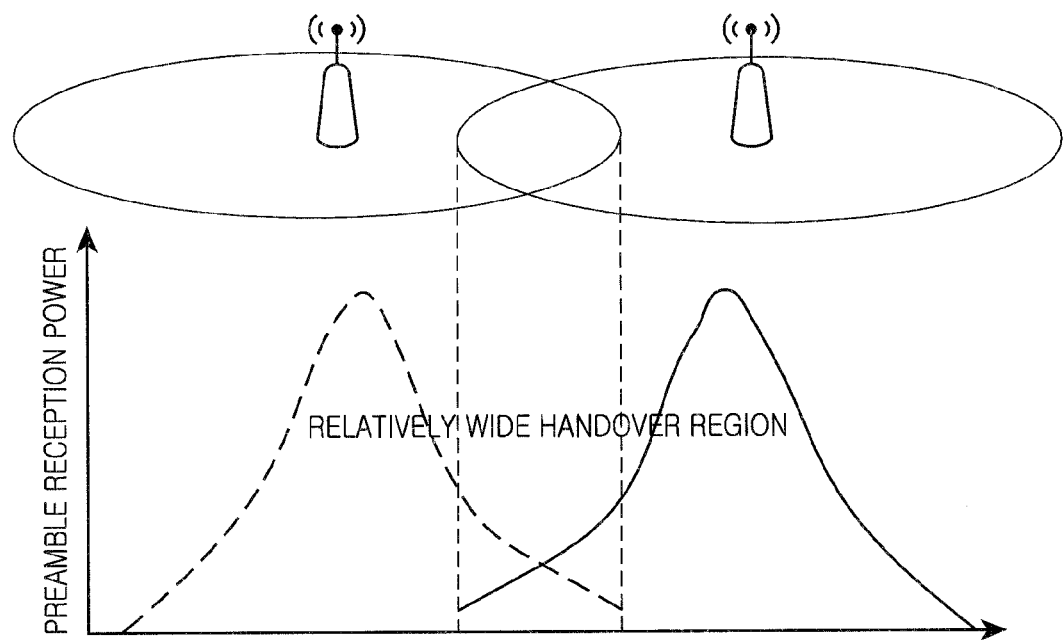
FIGS. 3A and 3B are diagrams for comparison of handover regions of a macro/micro cell environment and a Virtual Cell Network (VCN) environment according to an embodiment of the present disclosure.
Figure 3B:
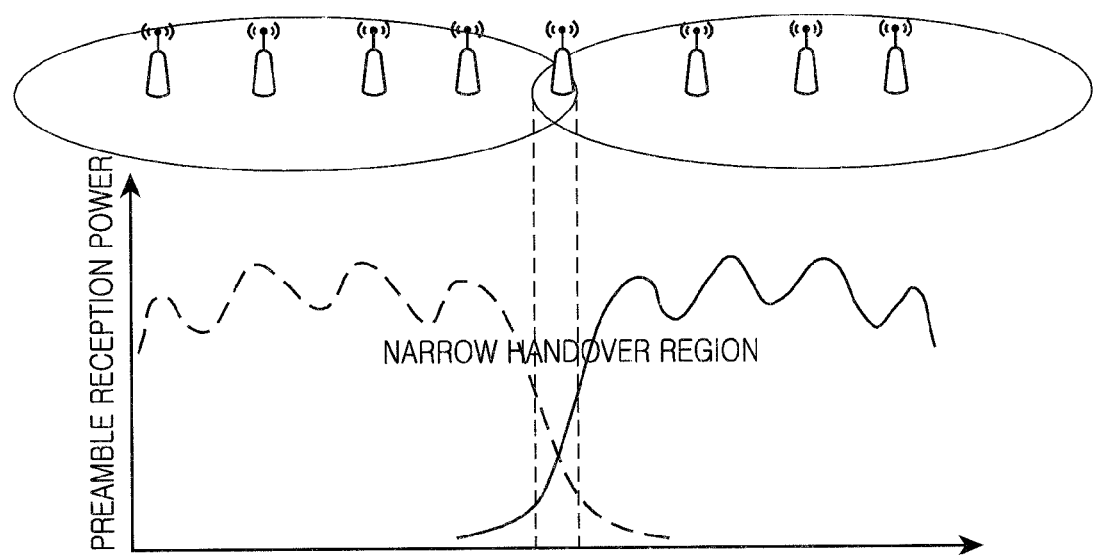

FIGS. 3A and 3B are diagrams for comparison of handover regions of a macro/micro cell environment and a VCN environment according to an embodiment of the present disclosure.

Referring to FIG. 3A, if a cell size is large like a macro cell, a superposition region between cells is physically large. Therefore, a relatively long time is taken for a UE to perform handover. However, there is a probability of a failure of handover due to the deterioration of reception signal quality, because the handover is carried out when reception signals from a serving BS and a target BS are all low.

In contrast, as illustrated in FIG. 3B, in a case where a plurality of DBSs form VCs, handover does not occur within the VC, but inter-VC handover is still needed. Because an interval between small BSs is small, a superposition region between small cells belonging to different VCs becomes small and as a result, a handover execution time of a UE becomes relatively short, thus making it difficult to execute stable handover. Further, there is a probability of a failure of handover due to the deterioration of a reception signal qualities, because the handover is carried out when reception signal strengths from a serving VC and a target VC are all low.

As such, a boundary region between VCs constructed by a plurality of small DBSs in a VCN environment is a boundary between small DBSs having small coverage, and causes a mobility problem about a narrow handover region.

The cell breathing scheme is a method for controlling inter-cell mobility through adaptive topology control. The cell breathing scheme is a scheme of adaptively controlling a serving cell servicing UEs, according to a difference of a load between cells. This cell breathing scheme, which is a way of changing allocation of a serving BS of UEs according to the load, is a way of controlling the load per cell through handover rather than improving handover performance itself. A scheme of controlling cell coverage by controlling a transmission power of a BS has been disclosed in "ON CELL BREATHING IN CDMA NETWORKS" Proc. IEEE Int'l Conf. Comm. (ICC '98), pp. 985-988, 1998 and Y. Bejerano and S. J. Han, "CELL BREATHING TECHNIQUES FOR LOAD BALANCING IN WIRELESS LANS" Proc. IEEE INFOCOM, 2006. A scheme of adaptively allocating a serving BS per UE through handover margin control has been disclosed in European Patent No. 0981919 B1 (Jan. 24, 2007), entitled "HANDOVER METHOD FOR CELL BREATHING BASED ON DYNAMICALLY ADJUSTING HANDOVER THRESHOLDS WITH CELL CAPACITY".

In a case of the cell breathing scheme through the transmission power control, the expansion of a superposition region through the transmission power control and the improvement of a signal quality upon handover may be available, but the improvement is limited to a transmission power control range and also there is a probability in which a coverage hole can be generated due to a relation problem with a different adjacent cell according to transmission power change. In a case of the cell breathing scheme through the handover margin control, there is an advantage that the cell load control of a UE unit, not a system dimension, is available, and the coverage hole problem does not occur, but there is still a probability in which handover is performed in a narrow handover region and at a low reception signal level upon application to a VCN.

Accordingly, an embodiment of the present disclosure proposes a method for determining a boundary region between VCs as a boundary between small DBSs having small coverage and addresses the issue of mobility control in a narrow handover region, thereby being capable of achieving a cell splitting gain and a cooperative communication gain through VC forming and, at the same time, efficiently improving the mobility problem between the VCs constructed by the plurality of cooperative small BSs. In the future, an intra-city middle/low speed vehicle mobile user may also need a high-capacity data service; accordingly, a VCN technology using small BSs should be able to effectively service not only a standing user but also a mobile user. In such an environment, the embodiment of the present disclosure proposes a main technology capable of more stably performing a handover operation through a wide handover region and a reception signal quality improvement by using the concept of so-called plural small cooperative or virtual cells.

An embodiment of the present disclosure described below provides a definition of an I-DBS corresponding to a boundary region between VCs, and proposes a concept in which the I-DBS is operated belonging to different VCs adjacent by time resource. In addition, the embodiment of the present disclosure provides a definition of a basic operation of the I-DBS, and proposes a frame structure of a wireless duration in which the I-DBS is operated. In order to improve the handover performance of a UE in a VCN environment, the embodiment of the present disclosure proposes an operation procedure for interaction between the UE and the I-DBS and between neighboring DBSs, when providing a stable handover to the UE by using the I-DBS. The term 'virtual cell breathing' used in describing the embodiment of the present disclosure below represents a way of selectively providing a more suitable VCN topology to a UE having mobility, by varying a VCN topology by resource such as time by means of the I-DBS capable of belonging to adjacent different VCs. This embodiment of the present disclosure can provide a wide handover region and stably perform a handover operation at an improved reception signal quality, by varying the VCN topology by resource such as time in a boundary region between virtual cells constructed by a plurality of small BSs.

Figure 4:
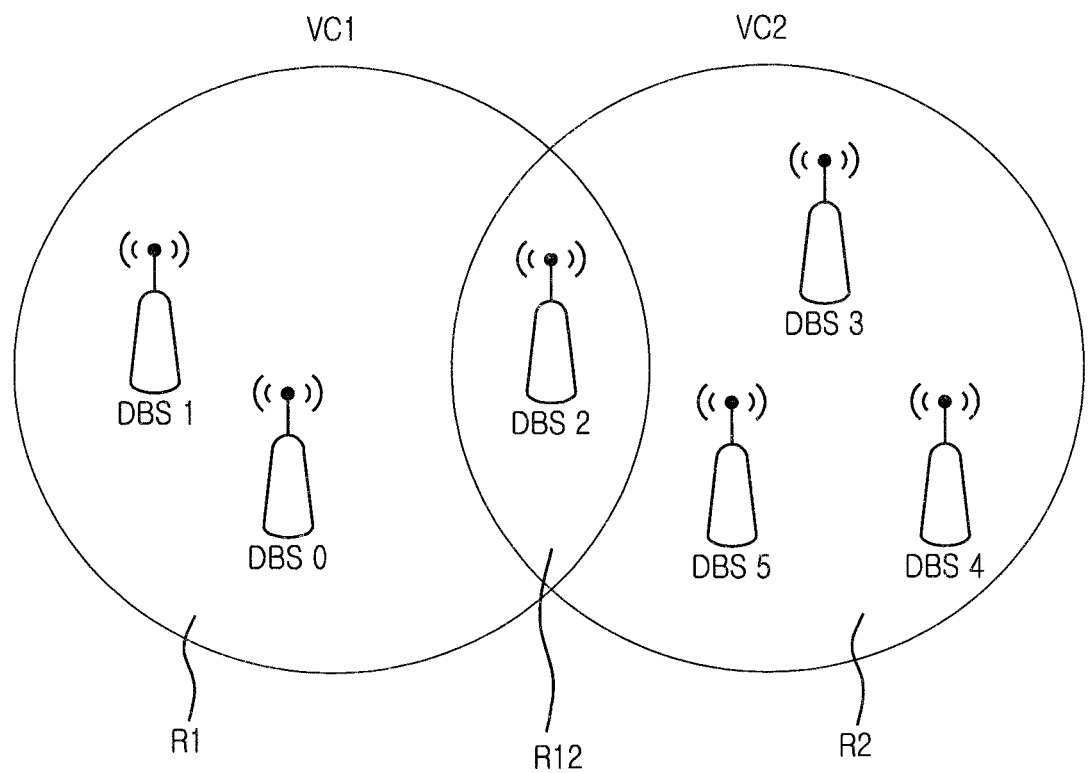
FIG. 4 is a diagram illustrating an operation of setting an Intermediate Distributed Base Station (I-DBS) at cell planning according to an embodiment of the present disclosure.

FIG. 4 is a diagram illustrating an operation of setting an I-DBS at cell planning according to an embodiment of the present disclosure.

Referring to FIG. 4, for convenience of description, FIG. 4 shows VCN including only two VCs (VC1 and VC2). However, the VCN can include a plurality of VCs.

The VC1 is formed including a plurality of DBSs (DBS0-DBS2). The VC2 is formed including a plurality of DBSs (DBS2-DBS5). The DBS0-DBS2 are located in a region (R1) of the VC1, and the DBS2-DBS5 are located in a region (R2) of the VC2. The DBS2 is located in a boundary region between the VC1 and the VC2, i.e., a region (R12) where the VC1 and the VC2 are superimposed. The DBS2 is set as the I-DBS.

Figure 5:
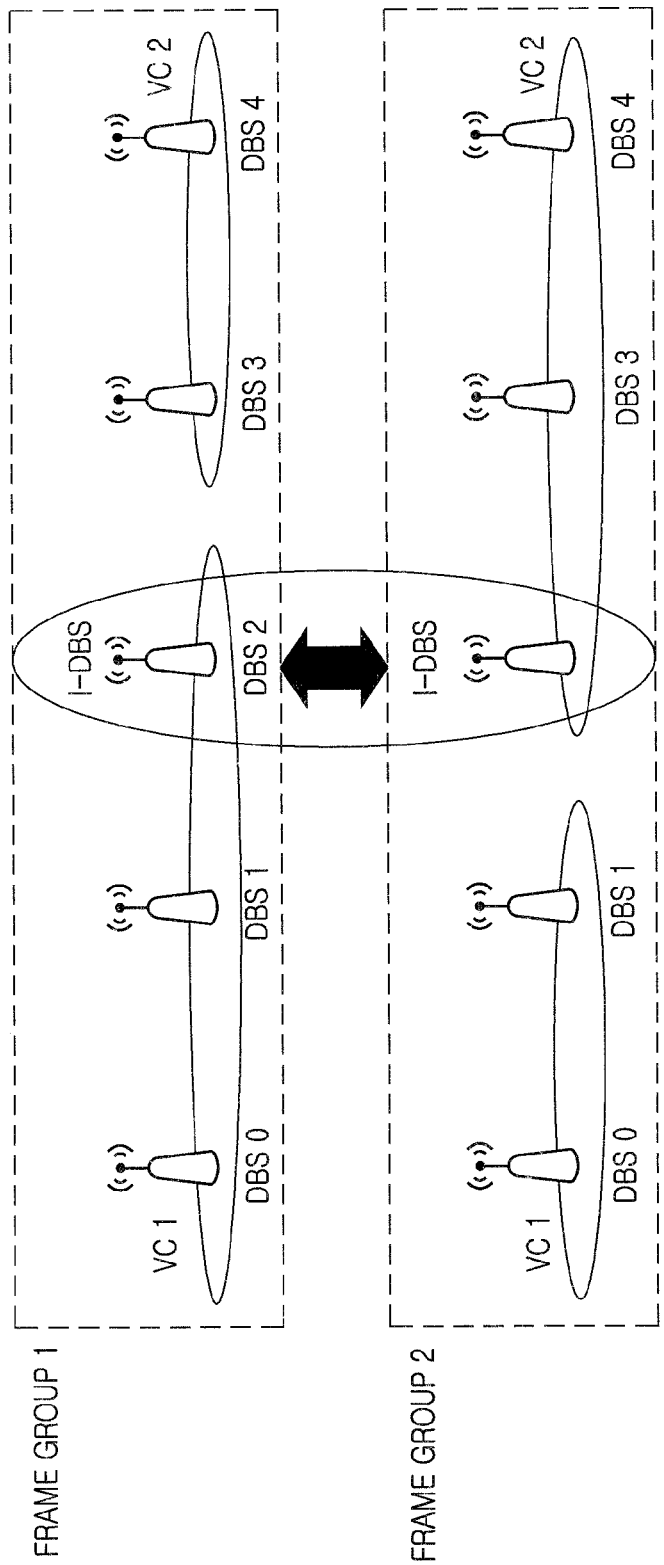
FIG. 5 is a diagram illustrating a VCN topology control operation using an I-DBS that belongs to a different virtual cell by frame group according to an embodiment of the present disclosure.

FIG. 5 is a diagram illustrating a VCN topology control operation using an I-DBS that belongs to a different virtual cell by frame group according to an embodiment of the present disclosure.

Figure 9:
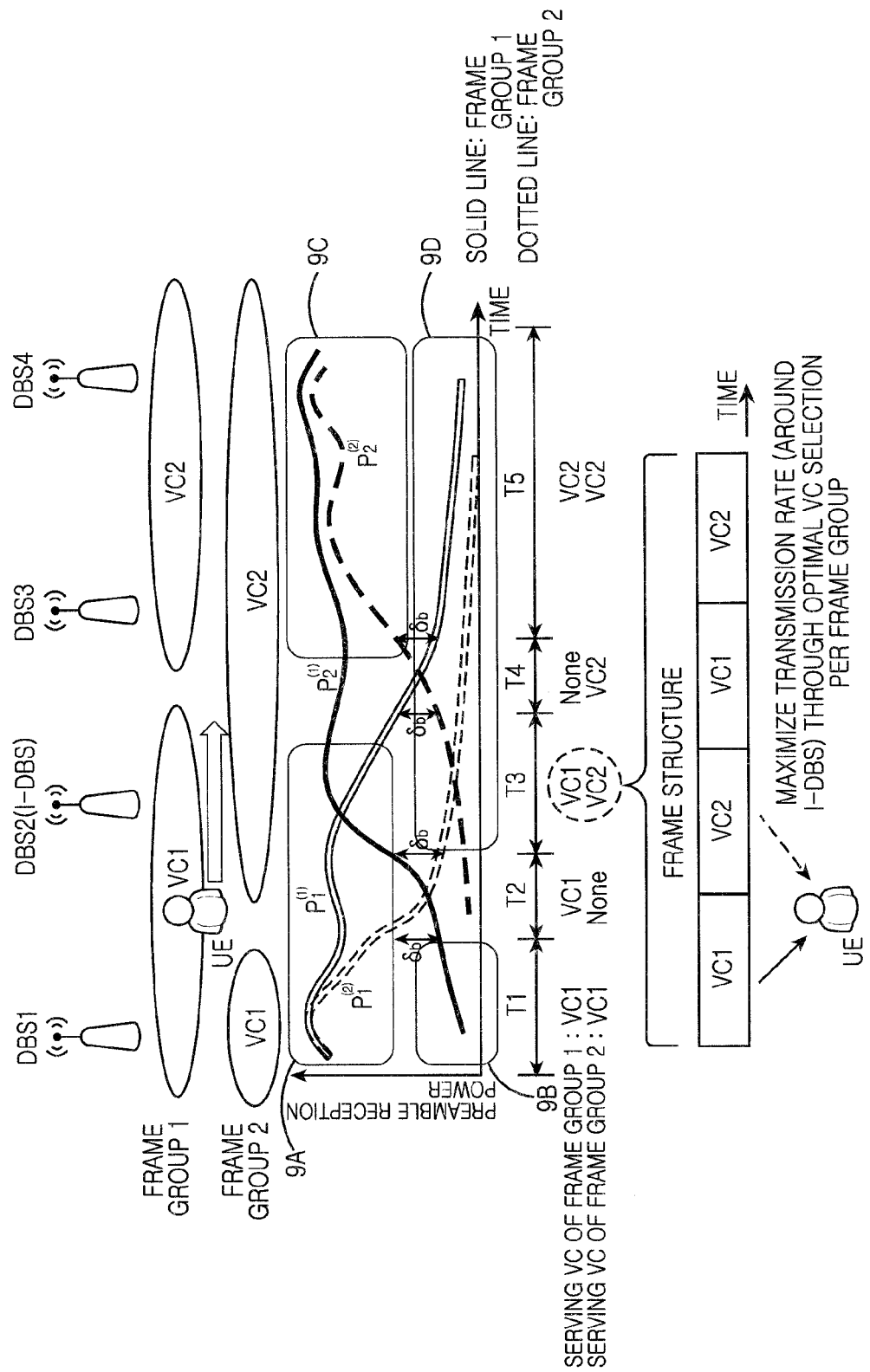
FIG. 9 is a diagram illustrating a multiple Virtual Cell (VC) transmission/reception operation in a handover region according to an embodiment of the present disclosure.

Referring to FIG. 5, the diagram shows an example of a basic operation of an I-DBS that broadcasts cell IDs of different VCs in a time division scheme and belongs to a VC. In FIG. 5, only two frame groups are illustrated. This exemplifies a case that, as illustrated in FIG. 4, a VCN is formed including two VCs and the I-DBS is located in a region where the two VCs are superimposed. Accordingly, as illustrated in FIG. 9, the number of frame groups can be variable in proportion to the number of regions where VCs are superimposed. Here, the frame group represents a time period during which a VC transmits/receives a signal.

Referring to FIG. 5, at a frame group 1, the I-DBS (DBS2) operates with a cell ID corresponding to a VC1, and belongs to the VC1 and performs cooperative communications with the other DBSs (DBS0 and DBS1) of the VC1. In addition, the I-DBS may operate with the cell ID corresponding to the VC1 but perform cooperative communications with DBSs (DBS3 and DBS4) belonging to a VC2 that is an adjacent VC. The I-DBS can be applied even to cooperative communication between different VCs. At a frame group 2, the I-DBS (DBS2) operates with a cell ID corresponding to the VC2, and belongs to the VC2 and performs cooperative communications with the other DBSs (DBS3 and DBS4) of the VC2. In addition, the I-DBS operates with the cell ID corresponding to the VC2 but performs cooperative communications with the DBSs (DBS0 and DBS1) belonging to the VC1 that is the adjacent other VC.

Frame resources can be adaptively allocated to UEs around an I-DBS in consideration of the coverage of a VC1 and a VC2 varying per frame group. According to this, handover may not occur to boundary users (i.e., UEs) between the I-DBS and DBSs around the I-DBS and, after a UE is moved to an I-DBS inner cell region, not a DBS boundary region, a more stable network-initiated handover can be performed.

Figure 6:
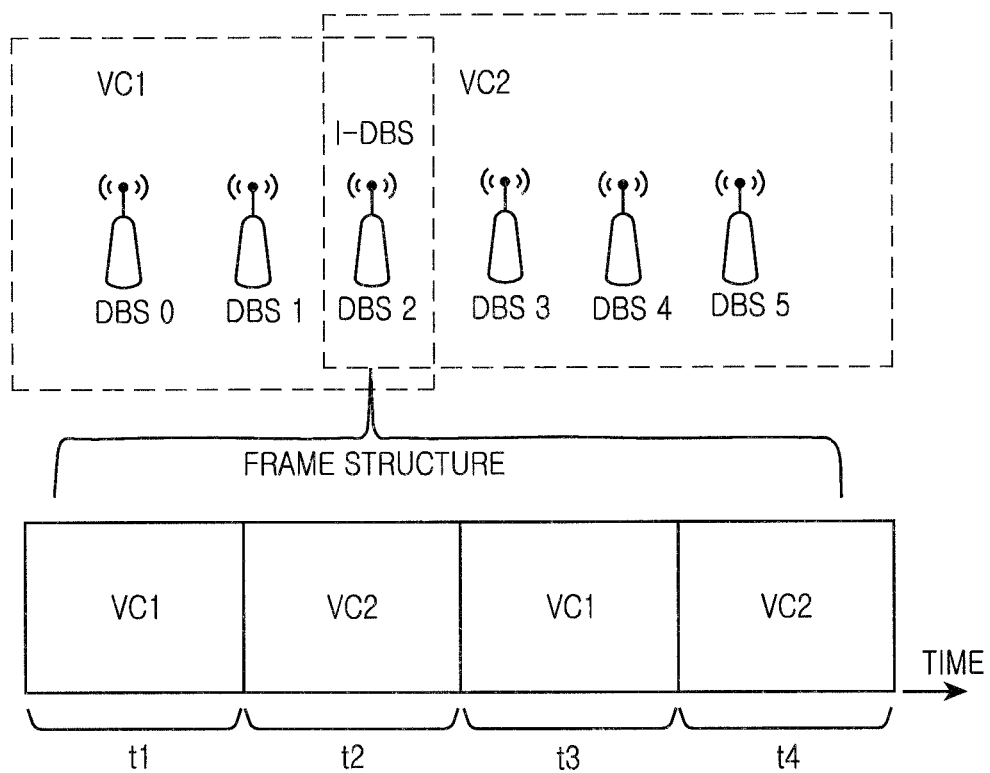
FIG. 6 is a diagram illustrating an I-DBS frame structure according to an embodiment of the present disclosure.

FIG. 6 is a diagram illustrating an I-DBS frame structure according to an embodiment of the present disclosure.

A DBS2 being an I-DBS broadcasts cell-specific RS and broadcast control information based on a VC1 and a VC2 by frame group. During a time t1 corresponding to a frame group 1, the DBS2 being the I-DBS belongs to the VC1 and broadcasts the cell-specific RS and broadcast control information based on the VC1. During a time t2 corresponding to a frame group 2, the DBS2 belongs to the VC2 and broadcasts the cell-specific RS and broadcast control information based on the VC2. After that, during a time t3, the I-DBS belongs to the VC1 and broadcasts the cell-specific RS and broadcast control information based on the VC1. During a time t4, the I-DBS belongs to the VC2 and broadcasts the cell-specific RS and broadcast control information based on the VC2.

The I-DBS transmits frames of different VCs during alternately repeated frame transmission durations. The I-DBS transmits a frame of the VC1 during a first time period, and transmits a frame of the VC2 during a second time period following the first time period, and alternately repeats this frame transmission operation. Through the above suitable resource allocation to the UEs per frame group, operations of some UEs may be available without handover even in a VC boundary. A handover issue between the VC1 and the VC2 can be changed into handover of the center of the I-DBS corresponding to a boundary between VCs by time, not a boundary between DBSs and therefore, more stable handover execution is available through handover execution of an I-DBS center region.

Unlike the case illustrated in FIG. 6, when the DBS2 belongs only to the VC1, the DBS2 always broadcasts the cell specific RS and broadcast control information based on the VC1. Even upon movement between the DBSs, the UE can move without handover within the VC1. However, upon movement from the VC1 to the VC2, the UE needs handover of the same form as that of a legacy cellular system. If a coverage region of each DBS is small, there is a problem that a handover execution time of a UE being under movement becomes short, because a physical superposition region between DBSs belonging to different VCs is narrow as illustrated in FIG. 3.

Figure 7:
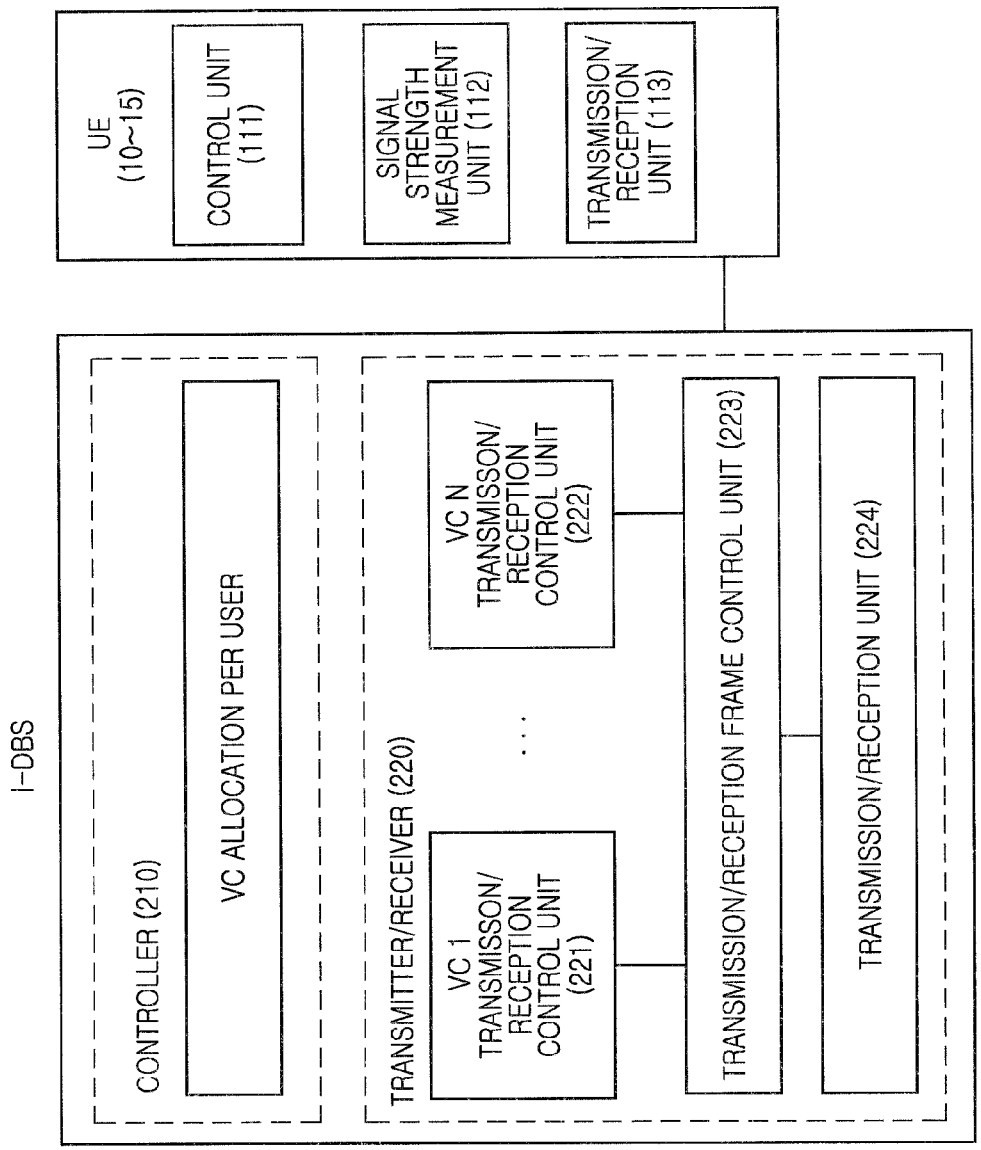
FIG. 7 is a diagram illustrating logical device constructions of an I-DBS and a User Equipment (UE) according to an embodiment of the present disclosure.

FIG. 7 is a diagram illustrating logical device constructions of an I-DBS and a UE according to an embodiment of the present disclosure.

Referring to FIG. 7, the I-DBS is a device capable of controlling a VCN topology upon VC breathing operation. At VC planning, a service provider can set as the I-DBS a DBS determined as needing a handover performance supplement, among DBSs corresponding to a boundary between VCs. For example, the DBS2 illustrated in FIG. 4 can be set as the I-DBS.

The I-DBS includes a controller 210 and a transmitter/receiver 220. The controller 210 performs a function of allocating a VC per user. The transmitter/receiver 220 includes a plurality of VC transmission/reception control units 221-222, a transmission/reception frame control unit 223, and a transmission/reception unit 224. The plurality of VC transmission/reception control units 221-222 controls the I-DBS to operate belonging to a plurality of VCs by frame group. The respective VC transmission/reception control units 221-222 perform a transmission/reception control operation for each VC. The transmission/reception frame control unit 223 performs, by frame group, allocation or reception of control signals and data signals of the plurality of VCs, and forms/receives/manages frames which are operable by the plurality of VCs. The transmission/reception unit 224 is a constituent element for signal transmission/reception with the UEs 10-15 and the upper CMU 40/macro BS 30 illustrated in FIG. 2.

In addition, the transmission/reception unit 224 performs signal transmission/reception for cooperative communications with the other DBSs belonging to a VC to which the I-DBS belongs, and performs signal transmission/reception for cooperative communications even with the other DBSs belonging to a VC that is adjacent to the VC to which the I-DBS belongs. The controller 210 communicates with the I-DBS in consideration of user's mobility, but the controller 210 determines whether it is advantageous to belong to any VC and perform communication in a handover performance and data capacity aspect, and performs a function of allocating a VC per user. FIG. 7 illustrates an example in which the controller 210 is constructed separately from the transmitter/receiver 220 and performs the function of allocating the VC per user. The transmitter/receiver 220 includes the plurality of VC transmission/reception control units 221-222 and the transmission/reception frame control unit 223; however, the controller or control units can be implemented by a single processor. The I-DBS performs an operation dependent on a processing flow of VC breathing according to an embodiment of the present disclosure described below with respect to FIG. 13 and FIG. 14.

The UEs 10-15 include a control unit 111, a signal strength measurement unit 112, and a transmission/reception unit 113. The transmission/reception unit 113 communicates with DBSs within a VC where the UE is located. The transmission/reception unit 113 performs signal transmission/reception with the I-DBS. During a first time period (i.e., a frame group 1), the signal strength measurement unit 112 measures a reception signal strength from a VC1 to which the I-DBS belongs. During a second time period (i.e., a frame group 2), the signal strength measurement unit 112 measures a reception signal strength from a VC2 to which the I-DBS belongs. For example, the signal strength measurement unit 112 receives control signals such as preambles from the VC1 and the VC2, and measures strengths of the received control signals. The control unit 111 controls the general operations of the UEs 10-15. The control unit 111 performs an operation dependent on a processing flow of VC breathing according to an embodiment of the present disclosure described below with respect to FIG. 13 and FIG. 15.

Figure 8:
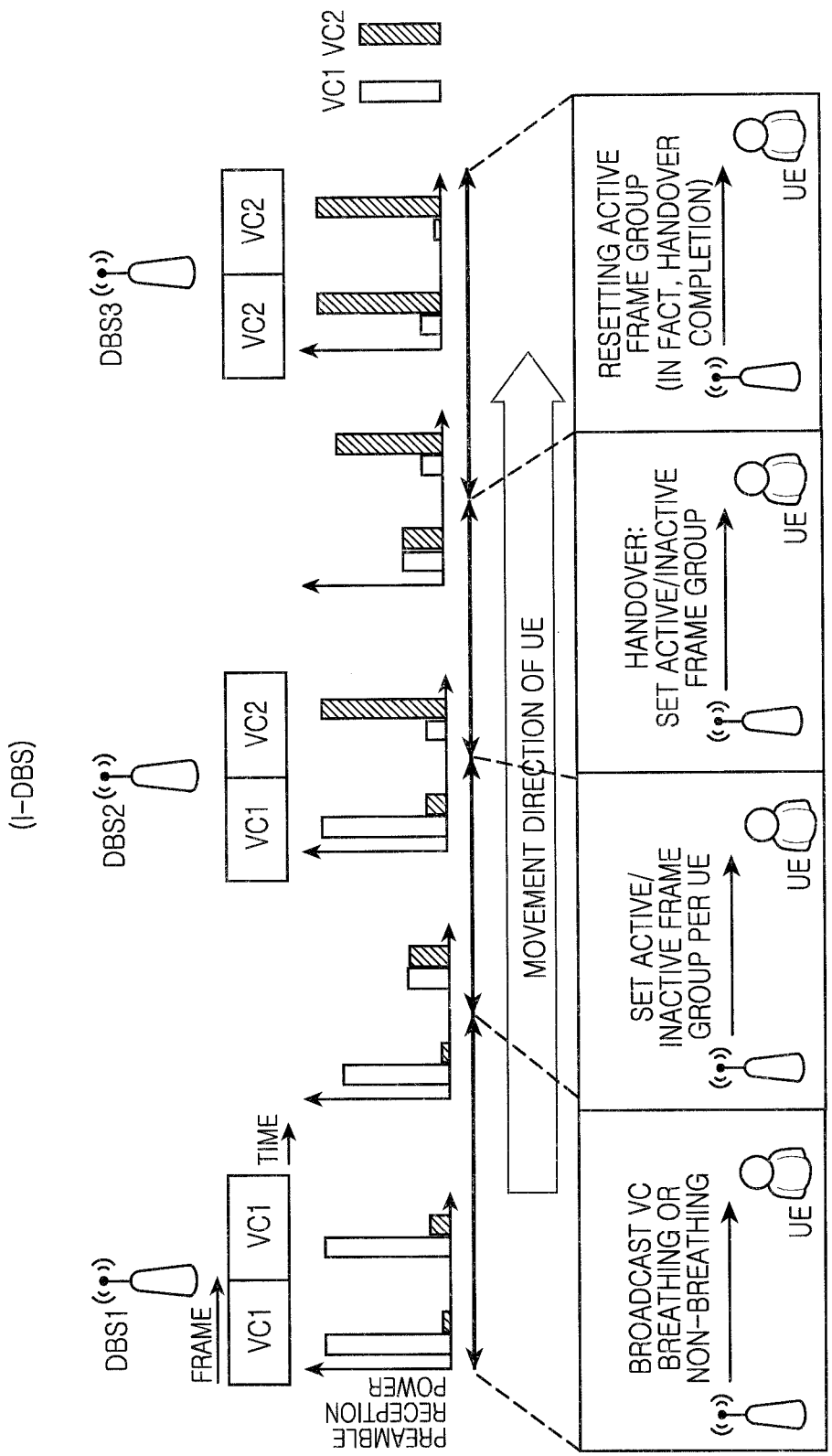
FIG. 8 is a diagram illustrating an active/inactive frame allocation operation per UE according to an embodiment of the present disclosure.

FIG. 8 is a diagram illustrating an active/inactive frame allocation operation per UE according to an embodiment of the present disclosure.

Referring to FIG. 8, the diagram shows an example of how frame groups of an I-DBS are allocated to a user who is moving, in order to improve handover performance per UE. The UE is moving from a DBS1 to a DBS3 via a DBS2, and the DBS2 takes charge of a role of the I-DBS. First, in a DBS1 region, the UE recognizes VC breathing or non-breathing of a system transmitted from the DBS1. In the DBS1 region, the UE recognizes a possibility of a change of reception power per frame group. In the absence of corresponding information, the UE receives reception signals of VCs varying per frame group. This can cause a confusion to control of mobility of the UE. At a frame group 1, the UE still belongs to a VC1 in a boundary region between the DBS1 and the DBS2 and thus the UE can perform a stable communication with the VC1 only at the frame group 1. In a center region of the DBS2, the UE can perform a stable communication with the VC1 at a frame group 1, and can perform a stable communication with the VC2 at a frame group 2. If it is determined that the UE is still moving to the DBS3, a system determines that the UE now needs a change from the frame group 1 to the frame group 2. In a DBS2 region, the UE enables stable communications with all the VC1 and the VC2 by frame group, but selects either the VC1 or the VC2 through frame group allocation. Accordingly, a frame group corresponding to a serving VC is defined as an active frame group, and other frame groups are defined as an inactive frame group.

The embodiment of the present disclosure can perform more stable handover execution compared to inter-cell boundary handover according to the related art by changing the frame group to service the UE in an excellent reception signal quality region of the DBS2, not the boundary region between the DBSs. In addition, according to the embodiment of the present disclosure, a UE in motion can perform more stable handover execution through a handover ready step that uses all the wide service coverage of the I-DBS, not the narrow boundary between the small DBSs.

In the DBS2 region, only some frame groups are set as active frame groups for the UE. In contrast, in a DBS3 region, all frame groups are set as active frame groups for the UE, so the UE performs communication with the VC2.

FIG. 9 is a diagram illustrating a multiple VC transmission/reception operation in a handover region according to an embodiment of the present disclosure.

Referring to FIG. 9, the diagram shows an example of a handover operation dependent on a reception signal magnitude of a control signal such as a preamble that becomes a cell association reference of a VC1 or VC2 of a UE which is under movement from the VC1 to the VC2.

According to the related art, handover occurs from the VC1 to the VC2 if a condition of Equation 1 below is satisfied for a predetermined time.

$$P_2 > \gamma \ \& \ P_1 + \delta_k < P_2 \quad (1)$$

In Equation 1, '$P_1$' represents a reception signal strength of the VC1, '$P_2$' represents a reception signal strength of the VC2, '$\delta_k$' represents a difference between '$P_1$' and '$P_2$', and '$\gamma$' represents a preset threshold reception signal value.

In contrast, according to the embodiment of the present disclosure, a frame of a VCi satisfying a condition of Equation 2 below for a predetermined time in order to become a frame capable of becoming an active frame (i.e., capable of becoming a serving VC) is defined as a candidate active frame.

$$P_i > \gamma \ \& \ P_j + \delta_b < P_i, \forall j \ne i \quad (2)$$

In Equation 2, '$P_i$' denotes a reception signal strength of the VCi, '$P_j$' denotes a reception signal strength of a VCj, '$\delta_b$' denotes a difference between $P_i$ and $P_j$, and '$\gamma$' denotes a preset threshold reception signal value. '$\delta_b$' is a parameter set such that a UE does not transmit/receive through a corresponding VC until a preamble reception power level is equal to or is greater than the '$\delta_b$' compared to an adjacent VC.

Figure 10:
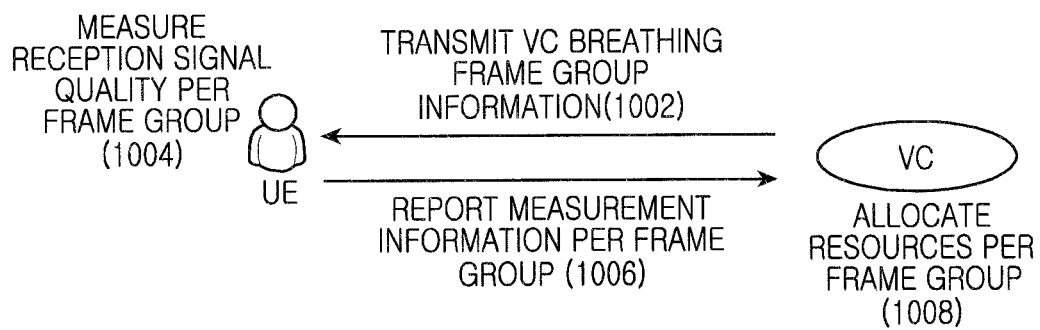
FIG. 10 is a diagram illustrating an operation of reporting a reception signal quality per frame group according to an embodiment of the present disclosure.

The controller 210 frame group allocation per UE for handover in consideration of elements such as a current system load, a ping-pong phenomenon, a Quality of Service (QoS), and the like among candidate active frames. For such an operation, the UE should report a reception signal quality (strength) per frame group to the I-DBS, the DBS, or the VC. FIG. 10 shows a related operation.

FIG. 10 is a diagram illustrating an operation of reporting a reception signal quality per frame group according to an embodiment of the present disclosure.

Referring to FIG. 10, in operation 1002, a VC sends a UE a notification of VC breathing related frame group forming information. In operation 1004, the UE measures a reception signal quality (strength) per frame group based on the corresponding information. In operation 1006, the UE reports measurement information per frame group to the VC. In operation 1008, the VC allocates a resource per frame group, based on the corresponding information.

Figure 11:
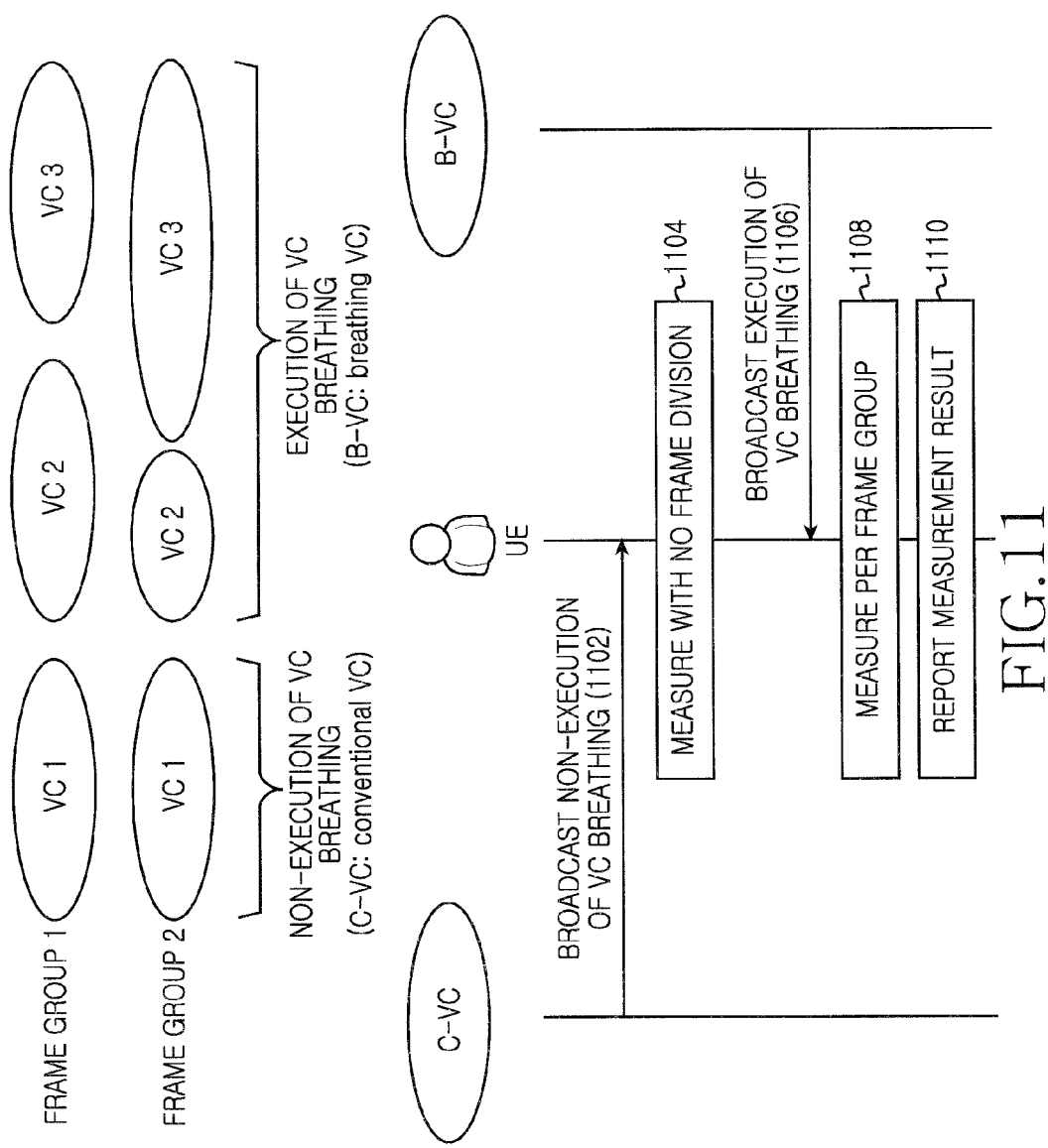
FIG. 11 is a diagram illustrating a measurement report operation dependent on VC breathing or non-breathing according to an embodiment of the present disclosure.

FIG. 11 is a diagram illustrating a measurement report operation dependent on VC breathing or non-breathing according to an embodiment of the present disclosure.

Referring to FIG. 11, a VC1 of a frame group 1 and frame group 2 is a Conventional VC (C-VC) not performing the VC breathing. In contrast, a VC2 of the frame group 1 and frame group 2 and a VC3 of the frame group 1 and frame group 2 are Breathing VCs (B-VCs) performing the VC breathing according to an embodiment of the present disclosure.

For the C-VC, a measurement report with no frame division is performed. In operation 1102, the C-VC broadcasts information about the non-execution of VC breathing to a UE. In operation 1104, the UE measures a reception signal strength for the C-VC without frame division and, in operation 1110, the UE reports the measurement result. A serving C-VC performs a measurement report operation with no frame group division, and an adjacent C-VC performs a measurement report operation with no frame group division. An adjacent B-VC obtains frame group information and performs a measurement report operation per frame group.

For the B-VC, measurement report per frame group is performed by obtaining frame group information about the B-VC and dividing a frame group. In operation 1106, the B-VC broadcasts information about the execution of VC breathing, to the UE. In operation 1108, the UE measures a reception signal strength per frame group and, in operation 1110, the UE reports the measurement result. A serving B-VC performs a measurement report operation with frame group division, and an adjacent C-VC performs a measurement report operation with no frame group division. An adjacent B-VC obtains the frame group information and performs the measurement report operation per frame group.

Referring again to FIG. 9, at the frame group 1, the DBS1 and the DBS2 form the VC1, and the DBS3 and the DBS4 form the VC2. At the frame group 2, the DBS1 forms the VC1, and the DBS2, the DBS3, and the DBS4 form the VC2. The DBS1 forms the VC1 at all the frame group 1 and the frame group 2, and the DBS2 being the I-DBS forms the VC1 at the frame group 1 and forms the VC2 at the frame group 2. The DBS3 and the DBS4 all form the VC2 at the frame group 1 and the frame group 2.

When the UE moves from the DBS1 to the DBS3, a serving VC of the frame group 1 and a serving VC of the frame group 2 are different from each other according to a preamble reception power by time period. During a time period T1 for which the UE is located in a DBS1 region, the serving VC of the frame group 1 and the serving VC of the frame group 2 are all the VC1. During a time period T2 for which the UE is located in a middle region between the DBS1 region and a DBS2 region, the serving VC of the frame group 1 is the VC1. During a time period T3 for which the UE is located in the DBS2 region being an I-DBS, the serving VC of the frame group 1 is the VC1, and the serving VC of the frame group 2 is a VC2. During a time period T4 for which the UE is located in a middle region between the DBS2 region and the DBS3 region, the serving VC of the frame group 2 is the VC2. During a time period T5 for which the UE is located in the DBS3 region, a middle region between the DBS3 region and a DBS4 region, and the DBS4 region, the serving VC of the frame group 1 and the serving VC of the frame group 2 are all the VC2.

In a graph which shows a preamble reception power dependent on time, reference numeral 9A denotes a VC1 serviceable duration of the frame group 1, reference numeral 9B denotes a VC1 serviceable duration of the frame duration 2, reference numeral 9C denotes a VC2 serviceable duration of the frame group 1, and reference numeral 9D denotes a VC2 serviceable duration of the frame group 2. In this graph, a solid line denotes the frame group 1, and a dotted line denotes the frame group 2. '$P_1^{(1)}$' denotes a reception signal power (i.e., a reception power) of the VC1 at the frame group 1, '$P_1^{(2)}$' denotes a reception power of the VC1 at the frame group 2, '$P_2^{(1)}$' denotes a reception power of the VC2 at the frame group 1, and '$P_2^{(2)}$' denotes a reception power of the VC2 at the frame group 2.

During the time period T1, the serving VCs of the frame group 1 and the frame group 2 are all the VC1, because the reception power ($P_1^{(1)}$) of the VC1 of the frame group 1 and the reception power ($P_1^{(2)}$) of the VC1 of the frame group 2 are all greater than '$\gamma$' and are also greater than the reception power ($P_2^{(1)}$) of the VC2 of the frame group 1 and the reception power ($P_2^{(2)}$) of the VC2 of the frame group 2, '$\delta_b$' or more, respectively. During the time period T2, the serving VC of the frame group 1 is the VC1, because the reception power ($P_1^{(1)}$) of the VC1 of the frame group 1 is greater than '$\gamma$' and is greater than the reception power ($P_2^{(1)}$) of the VC2 of the frame group 1, '$\delta_b$' or more. In contrast, the serving VC of the frame group 2 is not determined, because the reception power ($P_1^{(2)}$) of the VC1 of the frame group 2 is greater than '$\gamma$' but is not greater than the reception power ($P_2^{(2)}$) of the VC2 of the frame group 2, '$\delta_b$,' or more.

During the time period T3, the serving VC of the frame group 1 is the VC1, because the reception power ($P_1^{(1)}$) of the VC1 of the frame group 1 is greater than 'γ' and is also greater than the reception power ($P_2^{(1)}$) of the VC2 of the frame group 1, '$\delta_b$,' or more. The serving VC of the frame group 2 is the VC2, because the reception power ($P_2^{(2)}$) of the VC2 of the frame group 2 is greater than 'γ' and is greater than the reception power ($P_1^{(2)}$) of the VC1 of the frame group 2, '$\delta_b$,' or more. During the time period T4, the serving VC of the frame group 1 is not determined, because the reception power ($P_1^{(1)}$) of the VC1 of the frame group 1 is greater than 'γ' but is not greater than the reception power ($P_2^{(1)}$) of the VC2 of the frame group 1, '$\delta_b$,' or more. In contrast, the serving VC of the frame group 2 is the VC2, because the reception power ($P_2^{(2)}$) of the VC2 of the frame group 2 is greater than 'γ' and is greater than the reception power ($P_1^{(2)}$) of the VC1 of the frame group 2, '$\delta_b$,' or more. During the time period T5, the serving VCs of the frame group 1 and the frame group 2 are all the VC2, because the reception power ($P_2^{(1)}$) of the VC2 of the frame group 1 and the reception power ($P_2^{(2)}$) of the VC2 of the frame group 2 are all greater than 'γ' and are also greater than the reception power ($P_1^{(1)}$) of the VC1 of the frame group 1 and the reception power ($P_1^{(2)}$) of the VC1 of the frame group 2, '$\delta_b$,' or more, respectively.

A UE requiring a high-speed transmission rate does not communicate only at one frame group but can communicate with two VCs at two frame groups in a handover region around an I-DBS (i.e., in a region where the VC1 and the VC2 are superimposed). A description is made herein for a case that the UE communicates with the two VCs, but the UE can communicate with more than the two VCs as well.

Figure 12:
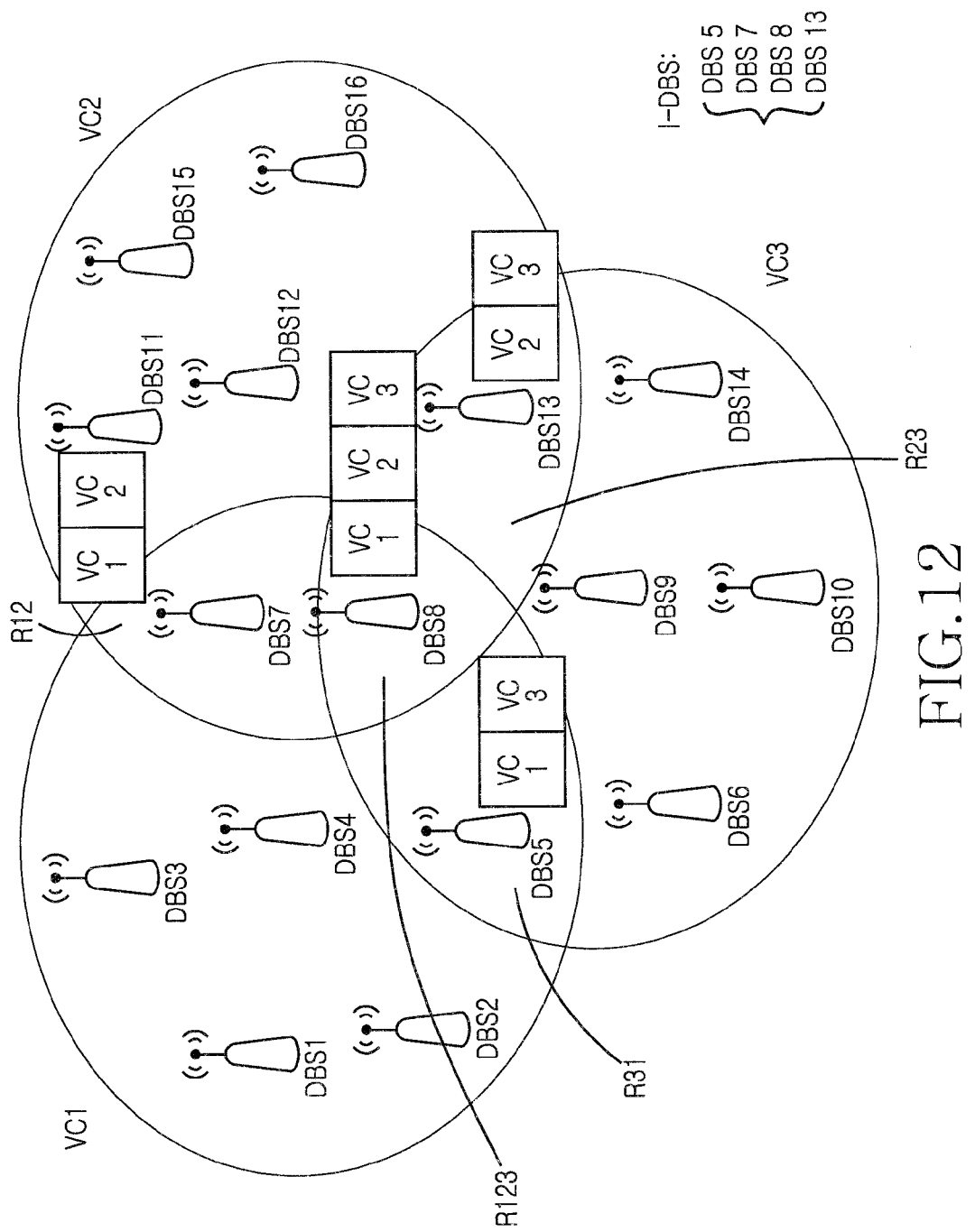
FIG. 12 is a diagram illustrating an operation of setting an I-DBS at cell planning according to another embodiment of the present disclosure.

FIG. 12 is a diagram illustrating an operation of setting an I-DBS at cell planning according to another embodiment of the present disclosure.

Referring FIG. 12, an I-DBS can be installed in a location where two or more VCs are superimposed, and the I-DBS may form a number of frame groups up to the number of the superimposed VCs. All DBSs do not operate as the I-DBS, but only a VC boundary DBS operates as the I-DBS or cell planning for I-DBS installation can be done only for a specific VC boundary area where there is a possibility frequent handover among VC boundary areas. In FIG. 12, as the I-DBS, a DBS8 is located in a region (R123) where three VCs (VC1, VC2, and VC3) are superimposed. The DBS8 forms frame groups of three (being the number of the superimposed VCs) and communicates with the three VCs. The remnant I-DBSs (DBS5, DBS7, and DBS13) are located in regions where two VCs are superimposed, and form frame groups of two being the number of the superimposed VCs and communicate with the two VCs.

The DBS5 is located in the region (R31) where two VCs (VC1 and VC3) are superimposed, and forms frame groups of two being the number of the superimposed VCs and communicates with the two VCs (VC1 and VC3). The DBS7 is located in the region (R12) where two VCs (VC1 and VC2) are superimposed, and forms frame groups of two being the number of the superimposed VCs and communicates with the two VCs (VC1 and VC2). The DBS13 is located in the region (R23) where two VCs (VC2 and VC3) are superimposed, and forms frame groups of two being the number of the superimposed VCs and communicates with the two VCs (VC2 and VC3).

Figure 13:
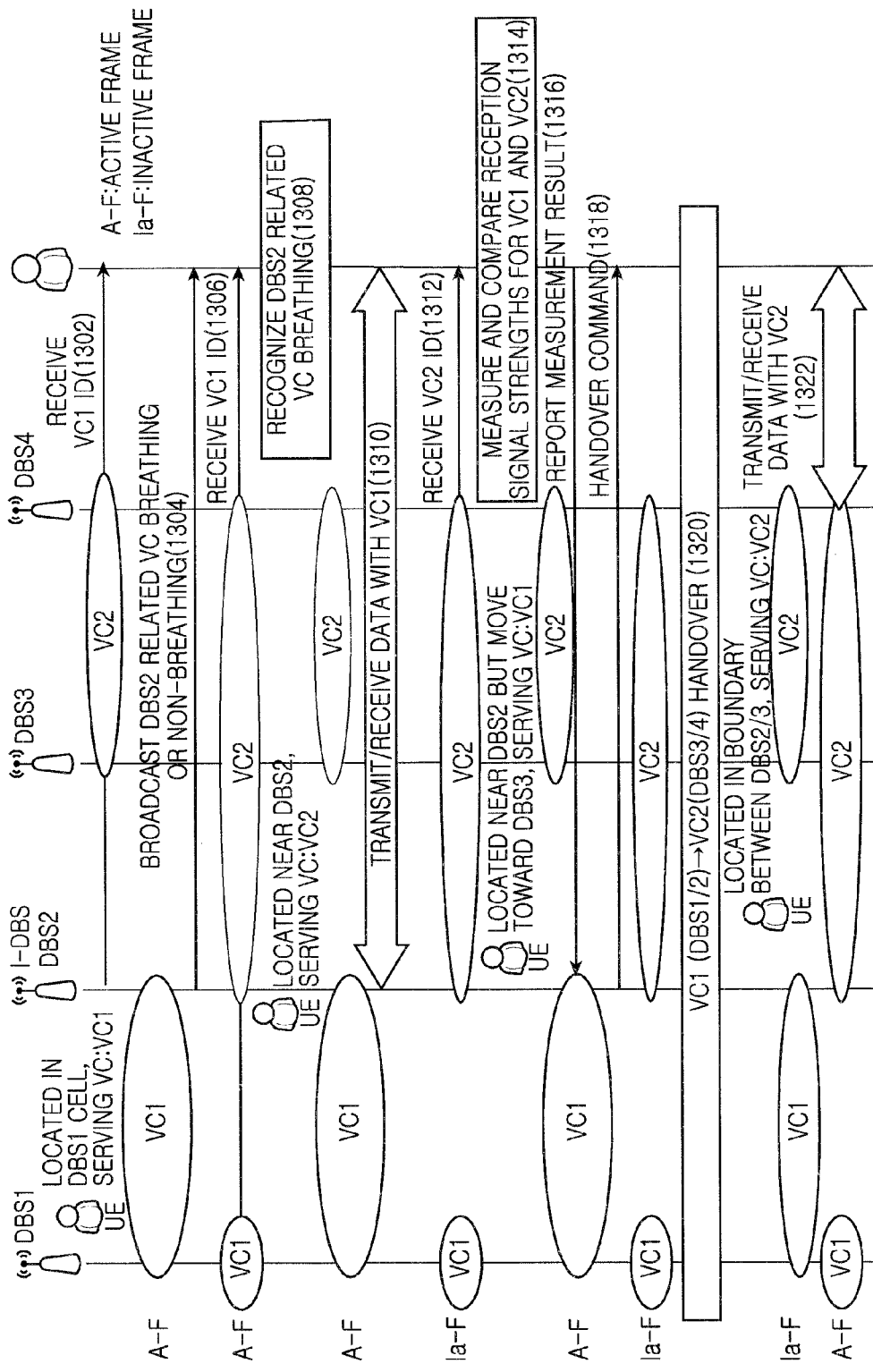
FIG. 13 is a ladder diagram illustrating an inter-VC handover operation using an I-DBS according to an embodiment of the present disclosure.

FIG. 13 is a ladder diagram illustrating an inter-VC handover operation using an I-DBS according to an embodiment of the present disclosure.

Referring to FIG. 13, the diagram includes a main operation related to active/inactive frame allocation of the present disclosure, as the inter-VC handover operation using the I-DBS. FIG. 13 shows an environment having a VCN where a VC1 is formed by a DBS1 and a DBS2, and a VC2 formed by a DBS3 and a DBS 4. The DBS2 performs a role of the I-DBS for the VC1 and the VC2. The embodiment of the present disclosure is described by way of an example of a case where two VCs (VC1 and VC2) each include two DBSs and the DBS2 located in the region where the two VCs (VC1 and VC2) are superimposed is set as the I-DBS, but the number of the DBSs constructing the VCs is changeable, and the number of the VCs superimposed in the region where the I-DBS is located is also changeable.

In FIG. 13, the VC1 serves as a serving VC of a UE when the UE is located in a region of the DBS1. In operation 1302, the UE receives a VC1 ID from the VC1.

In operation 1304, the VC1 broadcasts or unicasts to the UE a message indicating that the DBS2 belonging to the VC1 operates as the I-DBS. Accordingly, the UE can recognize a possibility in which a reception signal difference of VCs exists by frame group.

In operation 1306, the DBS2 belongs to the VC1 and the VC2 according to a frame group; however, the UE receives a service from the VC1 for all frame groups because the UE is located near the DBS 1. At this time, all the frame groups are set as active frames. The UE located near the DBS1 receives a VC1 ID. Likewise, even at a frame group at which the DBS2 belongs to the VC2, the UE belongs to the VC1 due to being located near the DBS1.

In operation 1308, the UE recognizes that reception signal magnitudes actually received from the VC1 and the VC2 per frame group vary due to a VC change dependent on a frame group of the DBS2. In the future, the VC1 can allocate a frame resource considering VC breathing if the UE is observed as moving to the DBS2.

If the UE moves near the DBS2, then a frame group at which the DBS2 belongs to the VC1 becomes an active frame group of the UE. Accordingly, in operation 1310, the UE still transmits/receives data with the VC1 for the active frame group.

In operation 1312, the frame group at which the DBS2 belongs to the VC2 is set as an inactive frame group of the UE. However, the UE receives control information (i.e., a VC2 ID) of the VC2 for the sake of future handover. The VC1 enables resource allocation to the UE only at the frame group at which the DBS2 belongs to the VC1.

In operation 1314, the UE has recognized the reception signal difference per frame group and thus, measures and compares reception signal strengths of the VC1 and the VC2 per frame group.

In operation 1316, the UE reports the reception signal strength measurement result for the VC1 and the VC2 to the VC1 through the active frame group with the VC1.

In operation 1318, when it is determined that the UE moves from the DBS2 to the DBS3, the VC1 instructs handover to the VC2 through the active frame group of the UE.

In operation 1320, the UE can receive signals of excellent quality from the VC1 and the VC2 by frame group, and perform handover from the VC1 to the VC2 through a frame group change.

In operation 1322, the frame group corresponding to the VC1 is changed as an inactive frame group, and the frame group corresponding to the VC2 is changed as an active frame group, so the UE transmits/receives data with the VC2 through the active frame group of the VC2.

Figure 14:
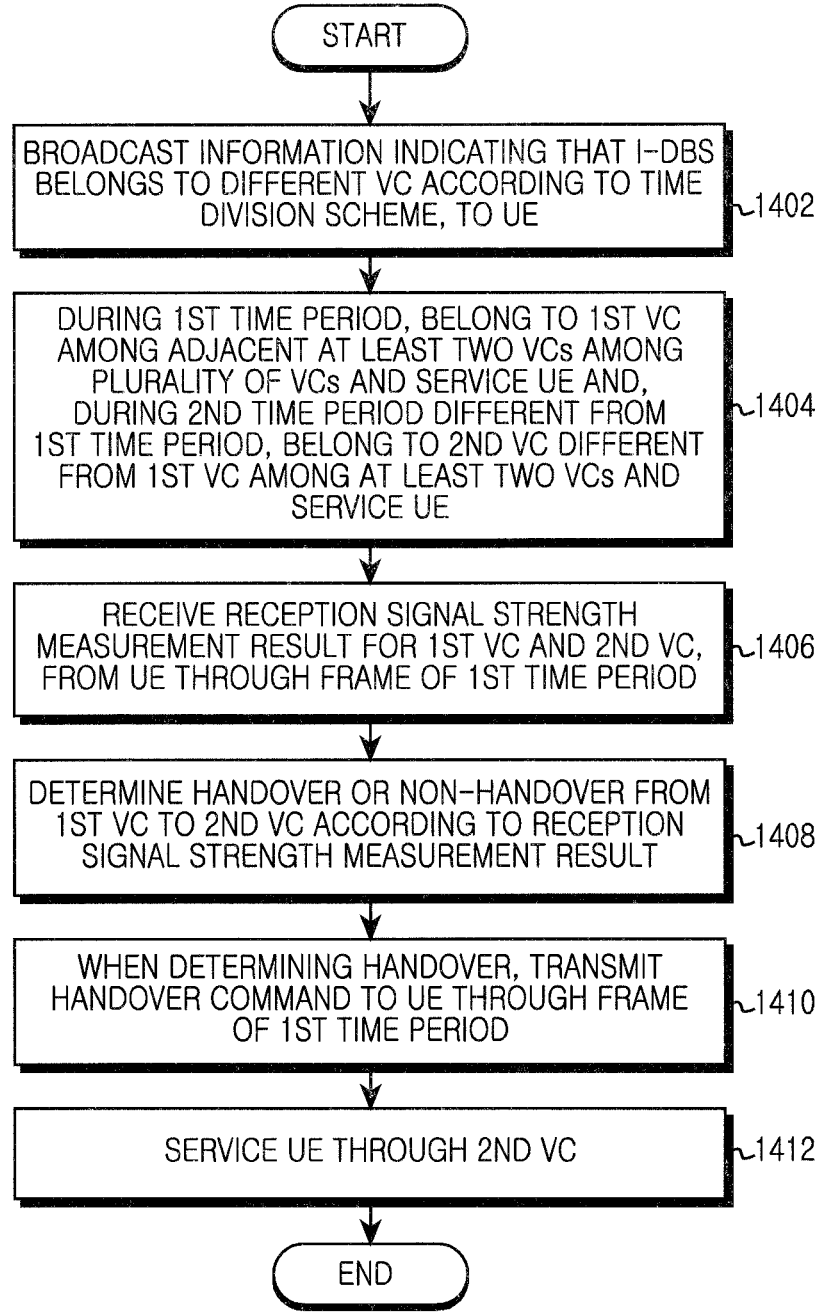
FIG. 14 is a flowchart illustrating a procedure of an I-DBS for a handover operation according to an embodiment of the present disclosure.

FIG. 14 is a flowchart illustrating a processing procedure of an I-DBS for a handover operation according to an embodiment of the present disclosure.

Referring to FIG. 14, the I-DBS is located in a region where two VCs (VC1 and VC2) are superimposed as described in FIG. 13; however, the number of VCs is changeable.

In operation 1402, the I-DBS broadcasts information to a UE indicating that the I-DBS belongs to a different virtual cell according to a time division scheme. In operation 1404, during a first time period (i.e., a frame group 1), the I-DBS belongs to a first virtual cell (VC1) among adjacent at least two virtual cells among a plurality of virtual cells, and services the UE. During a second time period (i.e., a frame group 2) different from the first time period, the I-DBS belongs to a second virtual cell (VC2) different from the first virtual cell (VC1) among the at least two virtual cells, and services the UE. In operation 1406, the I-DBS receives the reception signal strength measurement result for the first virtual cell (VC1) and the second virtual cell (VC2) from the UE through a frame of the first time period (i.e., the frame group 1). In operation 1408, the I-DBS determines handover or non-handover from the first virtual cell (VC1) to the second virtual cell (VC2) according to the reception signal strength measurement result. If the handover is determined, then in operation 1410, the I-DBS transmits a handover command to the UE through a frame of the first time period (i.e., the frame group 1). In operation 1412, the I-DBS services the UE through the second virtual cell (VC2).

Figure 15:
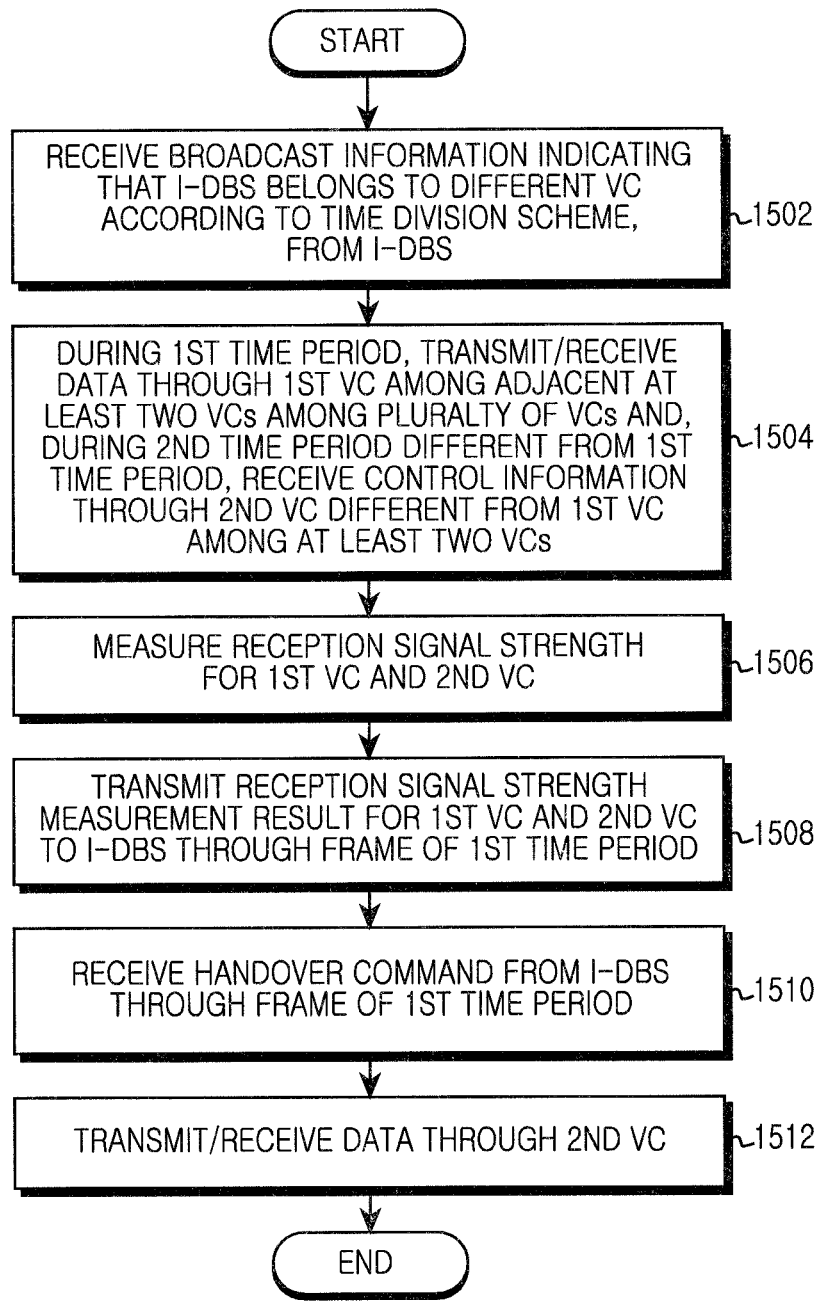
FIG. 15 is a flowchart illustrating a procedure of a UE for a handover operation according to an embodiment of the present disclosure.

FIG. 15 is a flowchart illustrating a procedure of a UE for a handover operation according to an embodiment of the present disclosure.

Referring to FIG. 15, an I-DBS is located in a region where two virtual cells (VC1 and VC2) are superimposed and the UE moves from the VC1 to the VC2 as described in FIG. 13; however, the number of virtual cells is changeable.

In operation 1502, the UE receives broadcast information indicating that the I-DBS belongs to a different virtual cell according to a time division scheme, from the I-DBS. In operation 1504, during a first time period (i.e., a frame group 1), the UE transmits/receives data through a first virtual cell (VC1) among adjacent at least two virtual cells among a plurality of virtual cells. A data transmission/reception operation through the VC1 includes an operation of receiving a VC1 ID. During a second time period (i.e., a frame group 2) different from the first time period (i.e., the frame group 1), the UE receives control information (i.e., a VC2 ID) through a second virtual cell (VC2) different from the first virtual cell (VC1) among the at least two virtual cells. In operation 1506, the UE measures reception signal strengths for the first virtual cell (VC1) and the second virtual cell (VC2). In operation 1508, the UE transmits the reception signal strength measurement result for the first virtual cell (VC1) and the second virtual cell (VC2), to the I-DBS through a frame of the first time period (i.e., the frame group 1). In operation 1510, the UE receives a handover command from the I-DBS through the frame of the first time period (i.e., the frame group 1). In operation 1512, the UE transmits/receives data through the second virtual cell (VC2).

Figure 16:
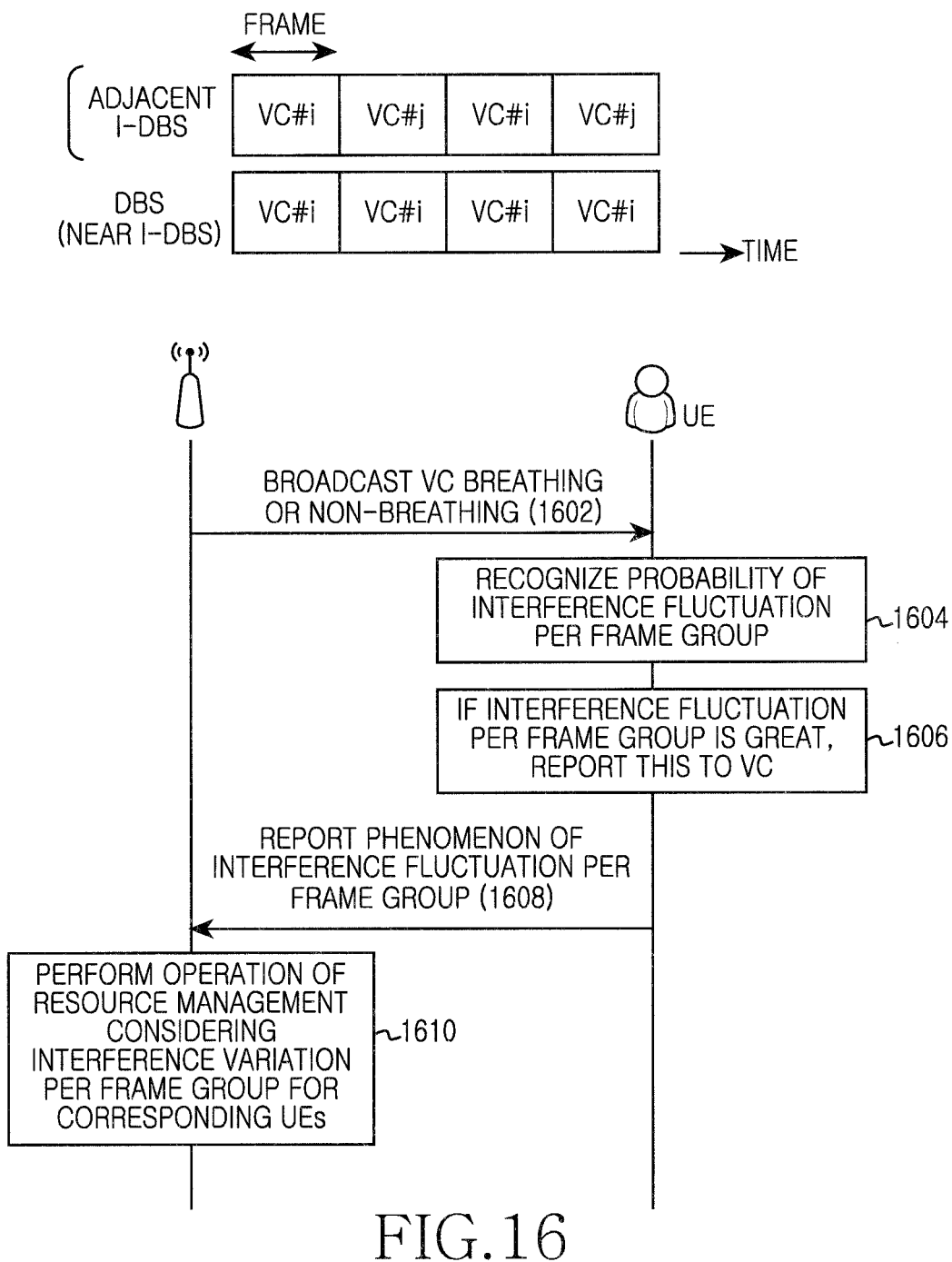
FIG. 16 is a diagram illustrating a message transmission/reception procedure for resource allocation considering an interference variation per frame group caused by VC breathing according to an embodiment of the present disclosure.

FIG. 16 is a diagram illustrating a message transmission/reception procedure for resource allocation considering an interference variation per frame group caused by VC breathing according to an embodiment of the present disclosure.

Referring to FIG. 16, the VC breathing according to the embodiment of the present disclosure can affect an operation other than inter-VC handover. For example, in a case of a UE within a DBS region other than an I-DBS, a problem of interference fluctuation per frame can occur due to the VC breathing based on the I-DBS. Accordingly, in operation 1602 of FIG. 16, a VC broadcasts a message to UEs indicating whether the VC is performing a VC breathing operation. If so, in operation 1604, as the VC breathing is operated, the UE recognizes a probability of interference fluctuation by frame group by means of the VC breathing.

In operation 1606 and operation 1608, as the interference fluctuation by frame group occurs, if it is determined that a fluctuation level is equal to or greater than a predetermined level, the UE reports the determination result to the VC. If so, in operation 1610, the VC can allocate resources to the UE in consideration of an interference variation per frame group.

In the case of a UE within an I-DBS region, a VC per frame can be changed due to the VC breathing based on the I-DBS and therefore, the UE within the I-DBS region needs resource allocation for control signal and data centering on an active frame. When the I-DBS operates for VCs of 'N' number, a Hybrid Automatic Repeat reQuest (HARQ) ACKnowledgement (ACK) of HARQ operation and a retransmission resource can be allocated considering the VC breathing in a form of a double number of (N−1) frames.

The embodiment of the present disclosure described above enables a stable and seamless handover operation by performing handover in a wide handover region and a cell center. The embodiment of the present disclosure provides a wider and more stable handover region, because a handover region is the entire coverage of one I-DBS, not a boundary between DBSs, and handover can be performed near the I-DBS. Secondly, the embodiment of the present disclosure does not cause a problem of a coverage hole in cell breathing because it is not a cell breathing operation controlling a transmission power. Thirdly, the embodiment of the present disclosure makes operation simple because a transmission power control operation is not necessary, and improves handover performance under a VC environment because a service provider installs the I-DBS in an area in which frequent handover occurs.

The embodiment of the present disclosure enables an adaptive cooperative communication structure because a data cooperative DBS cluster can be set as freely as ever.

Examples of Application of Embodiment

Figure 18:
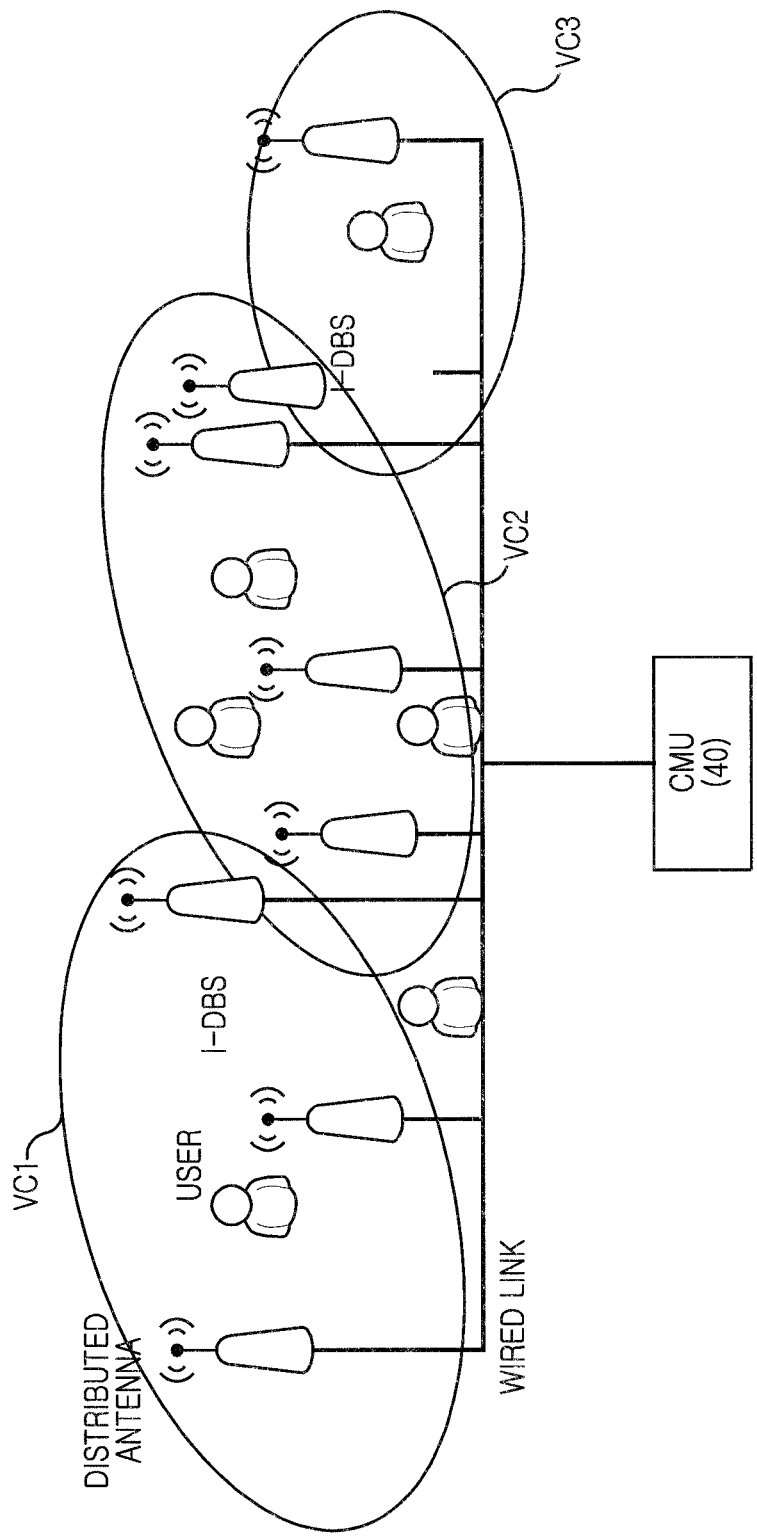
Figure 19:
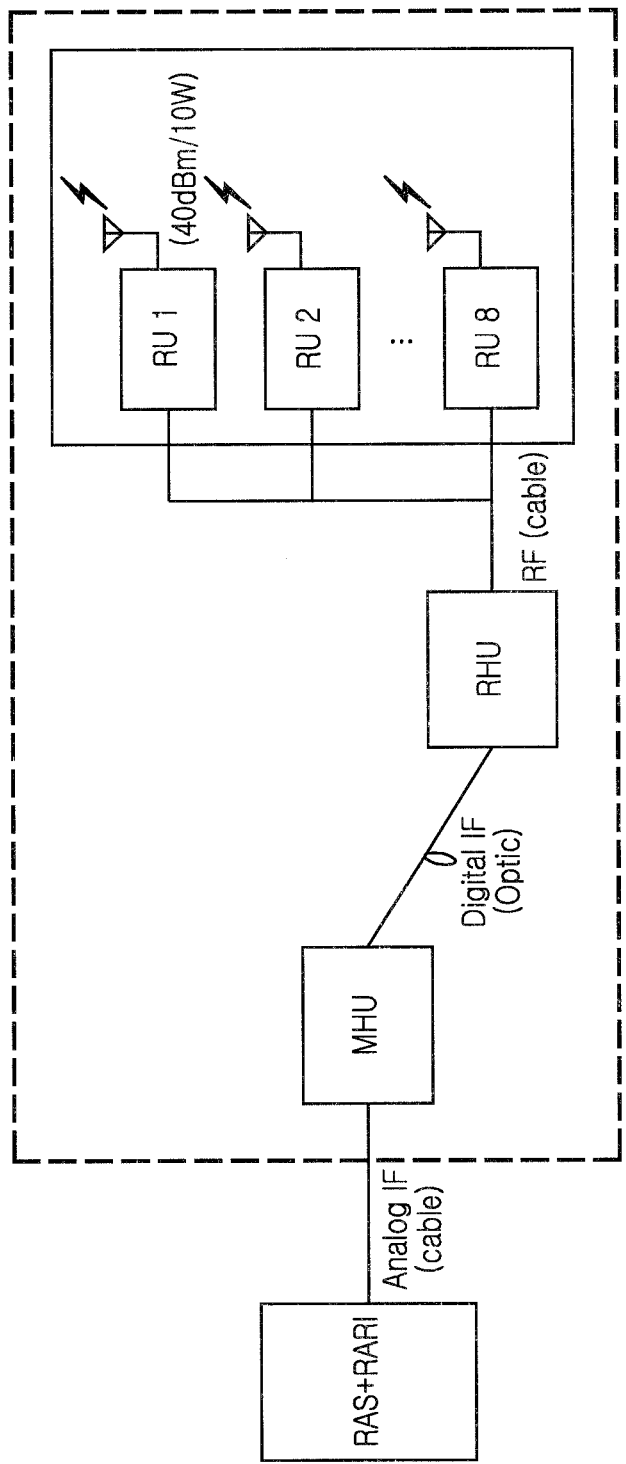

FIGS. 17 to 19 are diagrams illustrating environments according to various embodiments of the present disclosure.

Referring to FIGS. 17 to 19, FIG. 17 illustrates an outdoor VCN environment. According to the VCN environment, a plurality of DBSs are arbitrarily distributable, and a UE receives high-capacity wireless data from the DBSs. For example, a first virtual cell (VC1) can be formed including three DBSs, a second virtual cell (VC2) can be formed including five DBSs, and a third virtual cell (VC3) can be formed including two DBSs. The DBS located between the virtual cells (VC1 and VC2), and the DBS located between the virtual cells (VC2 and VC3) can be set as I-DBSs according to an embodiment of the present disclosure. The DBSs are connected to a central control device (i.e., a central management unit) through a wireless backhaul or a wired backhaul and thus, can perform a cooperative communication with each other. The central control device can be a macro BS servicing a larger area.

FIG. 18 illustrates an outdoor distributed antenna environment. According to the distributed antenna environment, a wireless transmission/reception control unit and/or a central control unit processing a baseband signal are separated from a wireless transmission/reception unit. For example, the wireless transmission/reception unit can be a distributed antenna and a Remote Radio Head (RRH), and the wireless transmission/reception control unit/central control unit can be a Central Management Unit (CMU) 40.

A plurality of wireless transmission/reception units are physically distributed and located out of the wireless transmission/reception control unit/central control unit, and are access the wireless transmission/reception control unit/central control unit through a wired link (e.g., an RF over fiber). For example, a first virtual cell (VC1) can be formed including three wireless transmission/reception units, a second virtual cell (VC2) can be formed including five wireless transmission/reception units, and a third virtual cell (VC3) can be formed including two wireless transmission/reception units. The wireless transmission/reception unit located between the virtual cells (VC1 and VC2), and the wireless transmission/reception unit located between the VC2 and the VC3 can be set as I-DBSs according to an embodiment of the present disclosure.

FIG. 19 illustrates an in-building wireless network environment. According to the wireless network environment, a Remote Hub Unit (RHU) and a plurality of Remote Units (RUs) are distributed within a building, and a Main Hub Unit (MHU) enables cooperation between the RHU and the RUs. The RHU and the RUs access each other through a Radio Frequency (RF) cable, and the RHU and the MHU access each other through a digital Intermediate Frequency (IF) optic fiber. The MHU accesses the Remote Access Server (RAS) and the RARI through an analog IF cable. The RUs enable implementation of a virtual cell according to a distribution form. This wireless network environment can become an indoor VCN.

As described above, the present disclosure has been described by the limited various embodiments and drawings but the present disclosure is not limited thereto; various modifications and changes from this disclosure can be made by a person of ordinary skill in the art. For example, a concrete embodiment of the present disclosure has been described by way of an example of setting as an I-DBS a DBS located in two or more virtual cells among virtual cells including DBSs under an outdoor VCN environment, and performing an operation dependent on the I-DBS. However, the various embodiments of the present disclosure can be identically applied to an outdoor distributed antenna environment or an in-building wireless network environment including a plurality of units cooperating with one another and performing a transmission/reception function as in the outdoor VCN environment.

An operation according to an embodiment of the present disclosure can be recorded in a non-transitory computer-readable medium including a program instruction for performing operations implemented by various computers. The non-transitory computer-readable medium can include a program instruction, a data file, a data structure and the like singularly or in combination. The program instruction can be an instruction specially designed and constructed for the present disclosure or can be an instruction well-known and usable by those skilled in the art. Examples of the non-transitory computer-readable recording medium include a magnetic medium such as a hard disk, a floppy disk, and a magnetic tape, an optical recording medium such as a Compact Disk-Read Only Memory (CD-ROM) or a Digital Versatile Disk (DVD), a magneto-optical medium such as a floptical disk, and a hardware device specially constructed to store and perform a program instruction such as a Read Only Memory (ROM), a Random Access Memory (RAM), a flash memory and the like. Examples of the program instruction include not only a mechanical language code made by a compiler but also a high-class language code executable by a computer through an interpreter and the like. If all or some of base stations described in the present disclosure or relays are implemented by the computer program, the computer-readable recording medium storing the computer program is included in the present disclosure.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An operation method of an intermediate distributed base station (I-DBS) in a wireless communication network, the method comprising:
    selectively belonging to at least two adjacent virtual cells (VCs), and
    servicing a user equipment (UE),
    wherein the each of the at least two adjacent VCs is generated by a plurality of distributed base station (DBSs),
    wherein the plurality of DBSs are located in a cell of a macro base station, and
    wherein the I-DBS is located in a region where the at least two adjacent VCs are superimposed.

2. The method of claim 1, further comprising:
    broadcasting information to the UE indicating that the I-DBS belongs to a different VC according to a different time period.

3. The method of claim 1, wherein the first time period and the second time period are alternately repeated frame transmission durations, and
    wherein the operations are carried out when the UE is located in the superposition region.

4. The method of claim 3, further comprising:
    receiving the reception signal strength measurement result for the first VC and the second VC of the at least two adjacent VCs, from the UE through a frame of the first time period.

5. The method of claim 4, further comprising:
    determining handover or non-handover from the first VC to the second VC according to the reception signal strength measurement result;
    transmitting, when determining the handover to the second VC, a handover command to the UE through the frame of the first time period; and
    servicing the UE through the second VC.

6. The method of claim 1,
    wherein, during a first time period, belonging to a first VC among the at least two adjacent VCs and servicing the UE, and
    wherein, during a second time period different from the first time period, belonging to a second VC among the at least two adjacent VCs and servicing the UE.

7. An operation method of a user equipment (UE) in a wireless communication network, the method comprising:
    communicating with an intermediate distributed base station (I-DBS) selectively belonging to at least two adjacent virtual cells (VCs),
    wherein the each of the at least two adjacent VCs is generated a plurality of distributed base station (DBSs),
    wherein the plurality of DBSs are located in a cell of a macro base station, and
    wherein the UE and the I-DBS are located in a region where the at least two adjacent VCs are superimposed.

8. The method of claim 7, further comprising:
receiving information broadcasted from the I-DBS, the broadcast information comprising information indicating that the I-DBS belongs to a different VC according to a different time period.

9. The method of claim 7, wherein the first time period and the second time period are alternately repeated frame transmission durations.

10. The method of claim 9, further comprising:
measuring reception signal strengths for the first VC and a second VC of the at least two adjacent VCs; and
transmitting the measurement result to the I-DBS through a frame of the first time period.

11. The method of claim 10, further comprising:
after transmitting the measurement result to the I-DBS, receiving a handover command from the I-DBS through the frame of the first time period; and
transmitting/receiving data through the second VC.

12. The method of claim 7,
wherein, during a first time period, transmitting/receiving data through the I-DBS belonging to a first VC among the at least two VCs, and
wherein, during a second time period different from the first time period, receiving control information through the I-DBS belonging to a second VC among the at least two adjacent VCs.

13. An apparatus of an intermediate distributed base station (I-DBS) in a wireless communication system, the apparatus comprising:
a controller configured to allocate at least two adjacent virtual cells (VCs) to a user equipment (UE); and
a transmitter/receiver configured to selectively perform, according to the allocation result of the controller, a signal transmission/reception operation with the UE through the at least two adjacent VCs,
wherein the each of the at least two adjacent VCs is generated by a plurality of distributed base station (DBSs),
wherein the plurality of DBSs are located in a cell of a macro base station, and
wherein the UE and the I-DBS are located in a region where the at least two adjacent VCs are superimposed.

14. The apparatus of claim 13,
wherein the first time period and the second time period are alternately repeated frame transmission durations, and
wherein the transmitter/receiver comprises:
a plurality of VC transmission/reception control units corresponding to the plurality of VCs, respectively;
a frame control unit configured to allocate the respective VCs to the frame transmission durations corresponding to the allocation result of the controller; and
a transmission/reception unit configured to transmit/receive a signal between the UEs through the VCs corresponding to the frame transmission durations allocated by the frame control unit.

15. The apparatus of claim 14,
wherein the transmitter/receiver is further configured to broadcast information to the UE indicating that the I-DBS belongs to a different VC according to a different time period, and
wherein the UE is located in the superposition region.

16. The apparatus of claim 15, wherein the transmitter/receiver is further configured to receive the reception signal strength measurement result for the first VC and the second VC of the at least two adjacent VCs from the UE through a frame of the first time period.

17. The apparatus of claim 16,
wherein the controller is further configured to:
determine handover or non-handover from the first VC to the second VC according to the reception signal strength measurement result, and
transmit, when determining the handover to the second VC, a handover command to the ME through the frame of the first time period, and
wherein the controller and the transmitter/receiver service the UE through the second VC.

18. The apparatus of claim 13, wherein the transmitter/receiver is further configured to:
perform, during a first time period, a signal transmission/reception operation with the UE through a first VC among the at least two adjacent VCs, and
perform, during a second time period, a signal transmission/reception operation with the UE through a second VC among the at least two adjacent VCs.

19. An apparatus of a user equipment (UE) in a wireless communication system the apparatus comprising:
a transmission/reception unit configured to transmit/receive data through an intermediate distributed base station (I-DBS) selectively belonging to at least two adjacent virtual cells (VCs),
wherein the each of the at least two VCs is generated by a plurality of distributed base station (DBSs),
wherein the plurality of DBSs are located in a cell of a macro base station, and
wherein the UE and the I-DBS are located in a region where the at least two adjacent VCs are superimposed.

20. The apparatus of claim 19, wherein the transmission/reception unit is further configured to receive information broadcasted from the I-DBS, the broadcast information comprising information indicating that the I-DBS belongs to a different VC according to a different time period.

21. The apparatus of claim 19, wherein the first time period and the second time period are alternately repeated frame transmission periods.

22. The apparatus of claim 21, further comprising:
a signal strength measurement unit configured to measure reception signal strengths for the first VC and the second VC of the at least two adjacent VCs,
wherein the transmission/reception unit transmits the measurement result to the I-DBS through a frame of the first time period.

23. The apparatus of claim 22, wherein, after transmitting the measurement result to the I-DBS, the transmission/reception unit is further configured to:
receive a handover command from the I-DBS through the frame of the first time period, and
transmits/receives data through the second VC.

24. The apparatus of claim 19, wherein the transmission/reception unit is further configured to:
transmit/receive, during a first time period, data through an intermediate distributed base station (I-DBS) belonging to a first VC among the at least two adjacent virtual cells (VCs), and
receive, during a second time period different from the first time period, control information through the I-DBS belonging to a second VC among the at least two adjacent VCs.

* * * * *